(12) United States Patent
Kamat et al.

(10) Patent No.: US 9,828,652 B2
(45) Date of Patent: Nov. 28, 2017

(54) HIGHLY FORMABLE AUTOMOTIVE ALUMINUM SHEET WITH REDUCED OR NO SURFACE ROPING AND A METHOD OF PREPARATION

(71) Applicant: NOVELIS INC., Atlanta, GA (US)

(72) Inventors: Rajeev G. Kamat, Marietta, GA (US); David Custers, Inverary (CA); Alok Gupta, Kingston (CA); Aude Despois, Grone (CH)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 14/993,653

(22) Filed: Jan. 12, 2016

(65) Prior Publication Data

US 2016/0201158 A1    Jul. 14, 2016

Related U.S. Application Data

(60) Provisional application No. 62/102,124, filed on Jan. 12, 2015.

(51) Int. Cl.
*C21D 9/46* (2006.01)
*C22C 21/08* (2006.01)
(Continued)

(52) U.S. Cl.
CPC ............ *C21D 9/46* (2013.01); *B22D 7/005* (2013.01); *B62D 25/00* (2013.01); *C21D 1/18* (2013.01);
(Continued)

(58) Field of Classification Search
CPC ......... B62D 25/00; C22F 1/047; B22D 7/005; C21D 9/46
(Continued)

(56) References Cited

U.S. PATENT DOCUMENTS 4,082,578 A * 4/1978 Evancho .................. C22F 1/05
148/535
4,722,751 A * 2/1988 Akechi ................ C22C 1/0416
419/32

(Continued)

FOREIGN PATENT DOCUMENTS

CN 103981404 A * 8/2014
CN WO 2015109893 A1 * 7/2015 ............. C22C 21/02
(Continued)

OTHER PUBLICATIONS

International Patent Application No. PCT/US2016/013029, International Search Report and Written Opinion, dated Apr. 21, 2016, 14 pages.

(Continued)

*Primary Examiner* — Pinel E Romain
(74) *Attorney, Agent, or Firm* — Kilpatrick Townsend & Stockton LLP

(57) ABSTRACT

Disclosed are novel processes to increase productivity on a continuous anneal and solution heat treatment line for heat-treatable automotive aluminum sheet products with high T4 and after-paint bake strengths and reduced roping. As a non-limiting example, the processes described herein can be used in the automotive industry. The disclosed heat treatable alloys and processes also may be applicable to the marine, aerospace, and transportation industries.

8 Claims, 33 Drawing Sheets

(51) Int. Cl.

| | |
|---|---|
| *C22C 21/02* | (2006.01) |
| *C22F 1/043* | (2006.01) |
| *C22F 1/047* | (2006.01) |
| *C21D 1/26* | (2006.01) |
| *C21D 1/18* | (2006.01) |
| *C21D 8/02* | (2006.01) |
| *B22D 7/00* | (2006.01) |
| *B62D 25/00* | (2006.01) |

(52) U.S. Cl.
 CPC .............. *C21D 1/26* (2013.01); *C21D 8/0226* (2013.01); *C21D 8/0236* (2013.01); *C22C 21/02* (2013.01); *C22C 21/08* (2013.01); *C22F 1/043* (2013.01); *C22F 1/047* (2013.01)

(58) Field of Classification Search
 USPC .......................................................... 296/191
 See application file for complete search history.

(56) References Cited

U.S. PATENT DOCUMENTS

| | | | |
|---|---|---|---|
| 4,897,124 A | 1/1990 | Matsuo et al. | |
| 5,480,498 A | 1/1996 | Beaudoin et al. | |
| 5,614,036 A * | 3/1997 | Imahashi | C22C 1/0416 148/437 |
| 5,616,189 A | 4/1997 | Jin et al. | |
| 6,120,623 A | 9/2000 | Gupta et al. | |
| 6,224,992 B1 * | 5/2001 | Delbeke | B32B 15/016 148/535 |
| 6,652,678 B1 | 11/2003 | Marshall et al. | |
| 2002/0174923 A1 | 11/2002 | Taguchi et al. | |
| 2004/0118493 A1 * | 6/2004 | Kimura | C22F 1/05 148/692 |
| 2005/0161979 A1 * | 7/2005 | Chernoff | B62D 25/105 296/191 |
| 2009/0230728 A1 * | 9/2009 | Kleber | B21D 39/021 296/191 |
| 2016/0137233 A1 * | 5/2016 | Park | B22D 21/04 420/532 |

FOREIGN PATENT DOCUMENTS

| | | |
|---|---|---|
| JP | 2004315878 A | 11/2004 |
| WO | 9531580 A1 | 11/1995 |
| WO | 9835069 A1 | 8/1998 |
| WO | 9837251 A1 | 8/1998 |

OTHER PUBLICATIONS

"International Alloy Designations and Chemical Composition Limits for Wrought Aluminum and Wrought Aluminum Alloys," Registration Record Series: Teal Sheets, Feb. 1, 2009, The Aluminum Association, Inc., 35 pages.

ASTM International, "Designation: B557-10, Standard Test Methods for Tension Testing Wrought and Cast Aluminum- and Magnesium-Alloy Products," Jul. 1, 2010, 15 pages, ASTM International, West Conshohocken, PA.

ASTM International, "Designation: B557M-10, Standard Test Methods for Tension Testing Wrought and Cast Aluminum- and Magnesium-Alloy Products (Metric)," Jul. 1, 2010, 15 pages, ASTM International, West Conshohocken, PA.

ASTM International, "Designation: E8/E8M-11, Standard Test Methods for Tension Testing of Metallic Materials," Dec. 1, 2011, 27 pages, ASTM International, West Conshohocken, PA.

Raabe, Dierk, "Ridging and roping phenomena in Aluminium," Believed to be published at least as early as Oct. 31, 2014, 17 pages, Max-Planck-Institut fur Eisenforschung GmbH, Dusseldorf, DE.

International Patent Application No. PCT/US2016/013029, International Preliminary Report on Patentability dated Jul. 27, 2017, 10 pages.

* cited by examiner

Table 1

| Reroll ID | Route | SHT | Pre-CR | BA | CR | Temper | Dir | YS MPa | UTS MPa | U. Elong % | Total Elong % | n | R |
|---|---|---|---|---|---|---|---|---|---|---|---|---|---|
| 2288338 | Self Anneal | 550°C/15s | No | No | 80% | T4 | L | 107 | 198 | 18.1 | 21.9 | 0.23 | 0.69 |
| 1617451 | Re-roll Batch Anneal | 550°C/15s | No | 400°C/2h | 78% | T4 | L | 123 | 228 | 21.5 | 25.0 | 0.24 | 0.70 |
| 1617451 | Re-roll Batch Anneal | 550°C/45s | No | 400°C/2h | 78% | T4 | L | 127 | 232 | 21.1 | 24.8 | 0.24 | 0.74 |
| 1617451 | Inter Batch Anneal | 550°C/15s | 49% | 400°C/2h | 57% | T4 | L | 126 | 231 | 22.2 | 25.6 | 0.24 | 0.77 |
| 1617451 | Inter Batch Anneal | 550°C/45s | 49% | 400°C/2h | 57% | T4 | L | 129 | 235 | 21.4 | 25.1 | 0.24 | 0.79 |
| 2288338 | Self Anneal | 550°C/15s | No | No | 80% | T4 | T | 92 | 191 | 19.7 | 22.9 | 0.24 | 0.56 |
| 1617451 | Re-roll Batch Anneal | 550°C/15s | No | 400°C/2h | 78% | T4 | T | 119 | 222 | 21.0 | 24.3 | 0.25 | 0.58 |
| 1617451 | Re-roll Batch Anneal | 550°C/45s | No | 400°C/2h | 78% | T4 | T | 127 | 227 | 21.4 | 24.3 | 0.24 | 0.61 |
| 1617451 | Inter Batch Anneal | 550°C/15s | 49% | 400°C/2h | 57% | T4 | T | 123 | 223 | 21.3 | 24.7 | 0.24 | 0.59 |
| 1617451 | Inter Batch Anneal | 550°C/45s | 49% | 400°C/2h | 57% | T4 | T | 125 | 227 | 21.8 | 25.6 | 0.24 | 0.58 |
| 2288338 | Self Anneal | 550°C/15s | No | No | 80% | T4 | D | 107 | 199 | 22.6 | 25.7 | 0.24 | 0.50 |
| 1617451 | Re-roll Batch Anneal | 550°C/15s | No | 400°C/2h | 78% | T4 | D | 136 | 235 | 22.6 | 26.3 | 0.23 | 0.43 |
| 1617451 | Re-roll Batch Anneal | 550°C/45s | No | 400°C/2h | 78% | T4 | D | 128 | 231 | 23.2 | 26.3 | 0.24 | 0.48 |
| 1617451 | Inter Batch Anneal | 550°C/15s | 49% | 400°C/2h | 57% | T4 | D | 127 | 230 | 22.7 | 27.1 | 0.24 | 0.51 |
| 1617451 | Inter Batch Anneal | 550°C/45s | 49% | 400°C/2h | 57% | T4 | D | 128 | 233 | 22.4 | 26.2 | 0.25 | 0.51 |
| 2288338 | Self Anneal | 550°C/15s | No | No | 80% | T4 + 20min@180°C | T | 133 | 220 | 16.5 | 18.9 | 0.19 | 0.57 |
| 1617451 | Re-roll Batch Anneal | 550°C/15s | No | 400°C/2h | 78% | T4 + 20min@180°C | T | 188 | 273 | 19.0 | 21.8 | 0.19 | 0.59 |
| 1617451 | Re-roll Batch Anneal | 550°C/45s | No | 400°C/2h | 78% | T4 + 20min@180°C | T | 189 | 277 | 18.3 | 21.9 | 0.19 | 0.61 |
| 1617451 | Inter Batch Anneal | 550°C/15s | 49% | 400°C/2h | 57% | T4 + 20min@180°C | T | 179 | 268 | 16.5 | 22.6 | 0.19 | 0.60 |
| 1617451 | Inter Batch Anneal | 550°C/45s | 49% | 400°C/2h | 57% | T4 + 20min@180°C | T | 184 | 273 | 19.2 | 22.4 | 0.19 | 0.57 |
| 2288338 | Self Anneal | 550°C/15s | No | No | 80% | T4 + 20min@180°C | L | 180 | 249 | 12.2 | 14.5 | 0.13 | 0.70 |
| 1617451 | Re-roll Batch Anneal | 550°C/15s | No | 400°C/2h | 78% | T4 + 20min@180°C | L | 235 | 304 | 14.9 | 19.2 | 0.15 | 0.73 |
| 1617451 | Re-roll Batch Anneal | 550°C/45s | No | 400°C/2h | 78% | T4 + 20min@180°C | L | 240 | 308 | 14.2 | 17.9 | 0.15 | 0.72 |
| 1617451 | Inter Batch Anneal | 550°C/15s | 49% | 400°C/2h | 57% | T4 + 20min@180°C | L | 232 | 304 | 14.6 | 18.9 | 0.15 | 0.79 |
| 1617451 | Inter Batch Anneal | 550°C/45s | 49% | 400°C/2h | 57% | T4 + 20min@180°C | L | 233 | 306 | 16.2 | 19.9 | 0.16 | 0.79 |
| 2288338 | Self Anneal | 550°C/15s | No | No | 80% | T4 + 20min@180°C | T | 177 | 245 | 12.6 | 15.0 | 0.14 | 0.58 |
| 1617451 | Re-roll Batch Anneal | 550°C/15s | No | 400°C/2h | 78% | T4 + 20min@180°C | T | 225 | 295 | 16.2 | 19.3 | 0.16 | 0.62 |
| 1617451 | Re-roll Batch Anneal | 550°C/45s | No | 400°C/2h | 78% | T4 + 20min@180°C | T | 233 | 302 | 15.0 | 19.3 | 0.15 | 0.61 |
| 1617451 | Inter Batch Anneal | 550°C/15s | 49% | 400°C/2h | 57% | T4 + 20min@180°C | T | 225 | 297 | 14.7 | 19.2 | 0.15 | 0.59 |
| 1617451 | Inter Batch Anneal | 550°C/45s | 49% | 400°C/2h | 57% | T4 + 20min@180°C | T | 224 | 298 | 16.0 | 19.3 | 0.16 | 0.58 |
| 2288338 | Self Anneal | 550°C/15s | No | No | 80% | T4 + 20min@180°C | D | 186 | 256 | 15.4 | 19.0 | 0.15 | 0.54 |
| 1617451 | Re-roll Batch Anneal | 550°C/15s | No | 400°C/2h | 78% | T4 + 20min@180°C | D | 235 | 306 | 15.2 | 19.6 | 0.15 | 0.44 |
| 1617451 | Re-roll Batch Anneal | 550°C/45s | No | 400°C/2h | 78% | T4 + 20min@180°C | D | 237 | 306 | 14.7 | 19.2 | 0.15 | 0.50 |
| 1617451 | Inter Batch Anneal | 550°C/15s | 49% | 400°C/2h | 57% | T4 + 20min@180°C | D | 228 | 299 | 15.5 | 20.1 | 0.15 | 0.51 |
| 1617451 | Inter Batch Anneal | 550°C/45s | 49% | 400°C/2h | 57% | T4 + 20min@180°C | D | 231 | 304 | 16.0 | 20.1 | 0.16 | 0.53 |

FIGURE 15

Table 2

| Roping Criteria | Visual Rating |
|---|---|
| Acceptable | 1 |
| Acceptable | 2 |
| Marginal (subject to customer acceptability) | 3 |
| Unacceptable | 4 |

| Process | Visual Rating |
|---|---|
| Self Annealed – CR - SHT | 2 |
| Invention – CR–BA–CR- SHT (550°C-15s) | 1 |
| Invention – CR-BA-CR- SHT (550°C-45s) | 1 |
| Invention – BA-CR- SHT (550°C-15s) | 1 |
| Invention – BA-CR- SHT (550°C-45s) | 1 |

FIGURE 16

Table 3

| Specimen Orientation | Pre-Strain (%) | Self Annealed | Re-roll Annealed | Intermediate Annealed |
|---|---|---|---|---|
| Longitudinal | 7 | 1.5 | 1.0 | 1.0 |
| Transverse | 7 | 1.0 | 1.0 | 1.5 |
| Diagonal | 7 | 1.5 | 1.0 | 1.0 |
| Longitudinal | 15 | 2.0 | 2.0 | 3.0 |
| Transverse | 15 | 2.0 | 2.0 | 1.5 |
| Diagonal | 15 | 2.0 | 2.0 | 3.0 |

| Hem Rating | Hem Appearance |
|---|---|
| 1 (Acceptable) | No cracking, no to mild orange peel |
| 2 (Acceptable) | No cracking, mild to heavy orange peel. |
| 3 (Unacceptable) | Crack initiation lines or discontinuous cracks parallel to bend line |
| 4 (Unacceptable) | Continuous cracks or complete, through-thickness fracture |

FIGURE 17

Table 4

| Test Piece Description | | Direction | t0(µm) | 10% (center) | | 15% (center) | | | 15% (edge 1) | | | 15% (edge 2) | | |
|---|---|---|---|---|---|---|---|---|---|---|---|---|---|---|
| | | | | R.diff | Avg. | R.diff | | Avg. | R.diff | | Avg. | R.diff | | Avg. |
| 23039321 | | L | 146 | 2 | 2 | 2 | 3 | 2.5 | 1 | 1 | 2 | 2 | 2 | 2 |
| | | T(C) | 127 | 2 | 4 | 1 | 1 | 4 | | | | | | |
| | | D(N) | 138 | 1 | 1 | 1 | 1 | 1.5 | | | | | | |
| 23039317 | | L | 133 | 1 | 1 | 1 | 1 | 1 | 1 | 1 | 1 | 1 | 1 | 1 |
| | | T(C) | 127 | Test not necessary | | 1 | 1 | 0.5 | Test not necessary | | | Test not necessary | | |
| | | D(N) | 127 | | | 0 | 1 | | | | | | | |
| 23039302 | | L | 136 | Test not necessary | | 2 | 2 | 2 | 1 | 1 | 1 | 1 | 1 | 1 |
| | | T(C) | 128 | | | 1 | 1 | 1 | Test not necessary | | | Test not necessary | | |
| | | D(N) | 129 | | | 1 | 1 | | | | | | | |
| 23039891 | | L | 132 | Test not necessary | | 1 | 1 | 0 | 1 | 1 | 1 | 1 | 1 | 1 |
| | | T(C) | 125 | | | 0 | 0 | 0 | Test not necessary | | | Test not necessary | | |
| | | D(N) | 127 | | | 1 | 1 | | | | | | | |
| 23039934 | | L | 130 | 1 | 1 | 1 | 1 | 1 | 1 | 1 | 1 | 1 | 1 | 1 |
| | | T(C) | 124 | 0 | 0 | 0 | 0 | 0 | Test not necessary | | | Test not necessary | | |
| | | D(N) | 123 | 1 | 1 | 1 | 1 | 1 | | | | | | |

FIGURE 18

Table 5

| Temper | Coil # | Coil Location | Direction | Yield Strength (MPa) | Ultimate Tensile Strength (MPa) | Uniform Elongation (%) | Total Elongation (%) | n-Value (Strain 10 % Tensile Strength 100 %) | r-Value (Strain 9 % Strain 11 %) |
|---|---|---|---|---|---|---|---|---|---|
| T4 | 2303891 | Back 100m | D | 129 | 238 | 23.3 | 27.3 | 0.25 | 0.30 |
| T4 | 2303891 | Back 200m | D | 128 | 238 | 23.0 | 27.0 | 0.25 | 0.31 |
| T4 | 2303891 | Middle | D | 126 | 235 | 22.6 | 26.1 | 0.25 | 0.30 |
| T4 | 2303891 | Front 200m | D | 127 | 238 | 23.0 | 27.1 | 0.25 | 0.31 |
| T4 | 2303891 | Front 100m | D | 122 | 231 | 22.9 | 26.9 | 0.25 | 0.32 |
| T4 | 2303891 | Back 100m | L | 138 | 248 | 18.9 | 23.0 | 0.23 | 0.74 |
| T4 | 2303891 | Back 200m | L | 137 | 247 | 19.0 | 23.2 | 0.23 | 0.67 |
| T4 | 2303891 | Middle | L | 132 | 243 | 18.6 | 22.6 | 0.24 | 0.71 |
| T4 | 2303891 | Front 200m | L | 132 | 245 | 19.1 | 23.2 | 0.24 | 0.72 |
| T4 | 2303891 | Front 100m | L | 130 | 241 | 18.9 | 22.9 | 0.24 | 0.72 |
| T4 | 2303891 | Back 100m | T | 132 | 238 | 21.1 | 25.6 | 0.24 | 0.70 |
| T4 | 2303891 | Back 200m | T | 131 | 236 | 19.9 | 24.1 | 0.24 | 0.68 |
| T4 | 2303891 | Middle | T | 127 | 234 | 20.0 | 24.2 | 0.25 | 0.67 |
| T4 | 2303891 | Front 200m | T | 124 | 233 | 20.2 | 24.4 | 0.25 | 0.69 |
| T4 | 2303891 | Front 100m | T | 123 | 230 | 20.4 | 24.7 | 0.25 | 0.65 |
| T4 | 2303917 | Back 100m | D | 135 | 244 | 22.5 | 26.5 | 0.25 | 0.30 |
| T4 | 2303917 | Back 200m | D | 134 | 244 | 22.9 | 26.9 | 0.25 | 0.29 |
| T4 | 2303917 | Middle | D | 130 | 239 | 22.7 | 26.6 | 0.25 | 0.30 |
| T4 | 2303917 | Front 200m | D | 129 | 239 | 22.1 | 26.0 | 0.25 | 0.29 |
| T4 | 2303917 | Front 100m | D | 130 | 240 | 23.0 | 27.0 | 0.25 | 0.28 |
| T4 | 2303917 | Back 100m | L | 139 | 250 | 18.8 | 22.9 | 0.23 | 0.71 |
| T4 | 2303917 | Back 200m | L | 140 | 250 | 18.7 | 22.8 | 0.23 | 0.70 |
| T4 | 2303917 | Middle | L | 137 | 248 | 18.7 | 22.7 | 0.23 | 0.69 |
| T4 | 2303917 | Front 200m | L | 133 | 246 | 18.8 | 22.2 | 0.24 | 0.70 |
| T4 | 2303917 | Front 100m | L | 134 | 247 | 18.7 | 22.7 | 0.24 | 0.70 |
| T4 | 2303917 | Back 100m | T | 134 | 242 | 19.8 | 24.0 | 0.24 | 0.67 |
| T4 | 2303917 | Back 200m | T | 133 | 241 | 20.3 | 25.0 | 0.24 | 0.66 |
| T4 | 2303917 | Middle | T | 130 | 239 | 20.1 | 24.3 | 0.24 | 0.68 |
| T4 | 2303917 | Front 200m | T | 127 | 237 | 20.4 | 25.0 | 0.25 | 0.65 |
| T4 | 2303917 | Front 100m | T | 129 | 238 | 20.4 | 24.7 | 0.24 | 0.68 |
| T4 | 2303921 | Back 100m | D | 143 | 255 | 22.4 | 26.4 | 0.25 | 0.31 |
| T4 | 2303921 | Back 200m | D | 142 | 253 | 22.6 | 26.7 | 0.24 | 0.34 |

FIGURE 19

| T4 | 2303921 | Middle | D | 140 | 254 | 22.8 | 26.0 | 0.25 | 0.31 |
| T4 | 2303921 | Front 200m | D | 137 | 251 | 23.3 | 26.6 | 0.25 | 0.35 |
| T4 | 2303921 | Front 100m | D | 136 | 251 | 23.1 | 27.1 | 0.25 | 0.34 |
| T4 | 2303921 | Back 100m | L | 149 | 263 | 19.7 | 24.0 | 0.23 | 0.68 |
| T4 | 2303921 | Back 200m | L | 149 | 263 | 19.2 | 23.1 | 0.23 | 0.66 |
| T4 | 2303921 | Middle | L | 147 | 263 | 20.0 | 24.0 | 0.24 | 0.64 |
| T4 | 2303921 | Front 200m | L | 143 | 260 | 19.8 | 23.9 | 0.24 | 0.66 |
| T4 | 2303921 | Front 100m | L | 142 | 259 | 19.6 | 23.6 | 0.24 | 0.67 |
| T4 | 2303921 | Back 100m | T | 141 | 252 | 20.0 | 24.1 | 0.24 | 0.64 |
| T4 | 2303921 | Back 200m | T | 142 | 252 | 21.0 | 25.3 | 0.24 | 0.57 |
| T4 | 2303921 | Middle | T | 139 | 252 | 21.4 | 25.7 | 0.25 | 0.58 |
| T4 | 2303921 | Front 200m | T | 135 | 248 | 21.0 | 25.3 | 0.25 | 0.58 |
| T4 | 2303921 | Front 100m | T | 134 | 247 | 20.7 | 25.0 | 0.25 | 0.58 |
| T4 | 23039302 | Back 100m | D | 131 | 241 | 22.7 | 26.6 | 0.25 | 0.30 |
| T4 | 23039302 | Back 200m | D | 131 | 241 | 23.0 | 26.4 | 0.25 | 0.31 |
| T4 | 23039302 | Middle | D | 128 | 239 | 23.5 | 27.7 | 0.25 | 0.33 |
| T4 | 23039302 | Front 200m | D | 125 | 236 | 23.4 | 26.9 | 0.25 | 0.29 |
| T4 | 23039302 | Front 100m | D | 124 | 235 | 23.2 | 27.1 | 0.26 | 0.31 |
| T4 | 23039302 | Back 100m | L | 140 | 253 | 18.9 | 23.0 | 0.24 | 0.68 |
| T4 | 23039302 | Back 200m | L | 140 | 254 | 19.5 | 23.7 | 0.23 | 0.69 |
| T4 | 23039302 | Middle | L | 137 | 250 | 19.4 | 23.4 | 0.24 | 0.66 |
| T4 | 23039302 | Front 200m | L | 133 | 247 | 19.3 | 23.4 | 0.24 | 0.68 |
| T4 | 23039302 | Front 100m | L | 133 | 247 | 19.5 | 23.5 | 0.24 | 0.67 |
| T4 | 23039302 | Back 100m | T | 134 | 244 | 19.6 | 23.6 | 0.25 | 0.63 |
| T4 | 23039302 | Back 200m | T | 133 | 243 | 20.1 | 24.2 | 0.25 | 0.62 |
| T4 | 23039302 | Middle | T | 130 | 240 | 20.7 | 24.1 | 0.25 | 0.64 |
| T4 | 23039302 | Front 200m | T | 126 | 237 | 21.2 | 25.6 | 0.25 | 0.62 |
| T4 | 23039302 | Front 100m | T | 125 | 236 | 20.6 | 24.8 | 0.25 | 0.65 |
| T4 | 2303934 | Back 100m | D | 127 | 242 | 24.6 | 28.8 | 0.26 | 0.32 |
| T4 | 2303934 | Back 200m | D | 128 | 242 | 24.0 | 28.0 | 0.26 | 0.35 |
| T4 | 2303934 | Middle | D | 127 | 235 | 22.5 | 26.5 | 0.25 | 0.40 |
| T4 | 2303934 | Front 200m | D | 121 | 233 | 23.6 | 27.7 | 0.26 | 0.33 |
| T4 | 2303934 | Front 100m | D | 125 | 234 | 24.0 | 27.8 | 0.25 | 0.36 |
| T4 | 2303934 | Back 100m | L | 133 | 248 | 19.9 | 24.1 | 0.24 | 0.69 |
| T4 | 2303934 | Back 200m | L | 132 | 247 | 20.0 | 24.2 | 0.24 | 0.72 |
| T4 | 2303934 | Middle | L | 130 | 245 | 19.6 | 23.7 | 0.24 | 0.70 |
| T4 | 2303934 | Front 200m | L | 128 | 243 | 19.3 | 23.3 | 0.24 | 0.68 |

FIGURE 19 cont.

| T4 | 2303934 | Front 100m | L | 127 | 243 | 19.9 | 24.1 | 0.24 | 0.72 |
| T4 | 2303934 | Back 100m | T | 126 | 237 | 20.7 | 24.8 | 0.25 | 0.66 |
| T4 | 2303934 | Back 200m | T | 125 | 237 | 20.6 | 24.7 | 0.25 | 0.65 |
| T4 | 2303934 | Middle | T | 124 | 235 | 20.7 | 24.8 | 0.25 | 0.67 |
| T4 | 2303934 | Front 200m | T | 122 | 233 | 20.5 | 24.6 | 0.25 | 0.66 |
| T4 | 2303934 | Front 100m | T | 121 | 233 | 20.9 | 25.0 | 0.25 | 0.69 |

FIGURE 19 cont.

Table 6

| Temper | Coil # | Coil Location | Direction | Yield Strength (MPa) | Ultimate Tensile Strength (MPa) | Uniform Elongation (%) | Total Elongation (%) |
|---|---|---|---|---|---|---|---|
| T81 | 2303891 | Back 100m | T | 213 | 294 | 17.0 | 21.9 |
| T81 | 2303891 | Back 200m | T | 210 | 291 | 16.4 | 20.8 |
| T81 | 2303891 | Middle | T | 215 | 294 | 16.3 | 21.2 |
| T81 | 2303891 | Front 200m | T | 213 | 293 | 16.3 | 21.1 |
| T81 | 2303891 | Front 100m | T | 210 | 290 | 16.4 | 21.5 |
| T81 | 2303917 | Back 100m | T | 224 | 300 | 16.0 | 20.8 |
| T81 | 2303917 | Back 200m | T | 224 | 301 | 16.3 | 21.4 |
| T81 | 2303917 | Middle | T | 220 | 297 | 16.7 | 22.1 |
| T81 | 2303917 | Front 200m | T | 213 | 293 | 16.6 | 21.6 |
| T81 | 2303917 | Front 100m | T | 212 | 293 | 16.7 | 21.6 |
| T81 | 2303921 | Back 100m | T | 220 | 302 | 16.8 | 21.3 |
| T81 | 2303921 | Back 200m | T | 220 | 301 | 17.4 | 22.2 |
| T81 | 2303921 | Middle | T | 219 | 302 | 17.7 | 22.3 |
| T81 | 2303921 | Front 200m | T | 221 | 302 | 16.8 | 21.2 |
| T81 | 2303921 | Front 100m | T | 216 | 296 | 16.7 | 20.2 |
| T81 | 23039302 | Back 100m | T | 209 | 291 | 16.7 | 21.0 |
| T81 | 23039302 | Back 200m | T | 205 | 288 | 17.1 | 21.5 |
| T81 | 23039302 | Middle | T | 210 | 292 | 16.5 | 20.8 |
| T81 | 23039302 | Front 200m | T | 207 | 289 | 17.0 | 21.3 |
| T81 | 23039302 | Front 100m | T | 206 | 288 | 16.6 | 21.0 |
| T81 | 2303934 | Back 100m | T | 194 | 282 | 17.8 | 22.0 |
| T81 | 2303934 | Back 200m | T | 190 | 278 | 18.0 | 22.5 |
| T81 | 2303934 | Middle | T | 198 | 284 | 17.8 | 22.6 |
| T81 | 2303934 | Front 200m | T | 195 | 281 | 17.1 | 21.5 |
| T81 | 2303934 | Front 100m | T | 195 | 282 | 17.9 | 23.0 |
| T81+2%PS | 2303891 | Back 100m | T | 253 | 310 | 15.4 | 21.1 |
| T81+2%PS | 2303891 | Back 200m | T | 253 | 310 | 14.8 | 19.7 |
| T81+2%PS | 2303891 | Middle | T | 248 | 306 | 15.0 | 19.9 |
| T81+2%PS | 2303891 | Front 200m | T | 241 | 302 | 15.3 | 20.2 |
| T81+2%PS | 2303891 | Front 100m | T | 239 | 299 | 15.4 | 20.8 |
| T81+2%PS | 2303917 | Back 100m | T | 259 | 313 | 14.7 | 19.9 |
| T81+2%PS | 2303917 | Back 200m | T | 259 | 314 | 14.6 | 19.3 |
| T81+2%PS | 2303917 | Middle | T | 256 | 311 | 14.6 | 19.3 |
| T81+2%PS | 2303917 | Front 200m | T | 249 | 307 | 15.2 | 20.4 |
| T81+2%PS | 2303917 | Front 100m | T | 249 | 307 | 15.1 | 20.2 |
| T81+2%PS | 2303921 | Back 100m | T | 261 | 317 | 14.9 | 19.3 |
| T81+2%PS | 2303921 | Back 200m | T | 265 | 320 | 15.6 | 21.0 |
| T81+2%PS | 2303921 | Middle | T | 255 | 314 | 15.9 | 20.5 |
| T81+2%PS | 2303921 | Front 200m | T | 253 | 312 | 15.6 | 20.1 |
| T81+2%PS | 2303921 | Front 100m | T | 251 | 310 | 15.4 | 20.1 |
| T81+2%PS | 23039302 | Back 100m | T | 251 | 309 | 15.1 | 19.7 |
| T81+2%PS | 23039302 | Back 200m | T | 249 | 307 | 15.3 | 19.9 |
| T81+2%PS | 23039302 | Middle | T | 250 | 307 | 14.4 | 18.5 |
| T81+2%PS | 23039302 | Front 200m | T | 246 | 304 | 15.3 | 20.0 |
| T81+2%PS | 23039302 | Front 100m | T | 246 | 304 | 15.0 | 19.5 |
| T81+2%PS | 2303934 | Back 100m | T | 234 | 297 | 16.0 | 20.9 |
| T81+2%PS | 2303934 | Back 200m | T | 232 | 295 | 16.2 | 21.4 |
| T81+2%PS | 2303934 | Middle | T | 237 | 298 | 15.5 | 20.1 |
| T81+2%PS | 2303934 | Front 200m | T | 235 | 297 | 15.3 | 19.6 |
| T81+2%PS | 2303934 | Front 100m | T | 234 | 297 | 15.9 | 20.8 |

FIGURE 20

Table 7

| Coils | Sample Location (ID/OD) | Solutionising Conditions | | | Direction | Gauge (mm) | Strength MPa | | n value (10-20%) | R (10%) Value | Elongation % | | |
|---|---|---|---|---|---|---|---|---|---|---|---|---|---|
| | | PMT | Soak above 540°C | RMT °C | | | UTS | YS | | | Uniform | Total | Ave* |
| | | | | | | | 4 Days of natural ageing | | | | | | |
| 127619 | ID | 548 | 8s | 85 | Transverse | 0.95 | 221 | 104 | 0.27 | 0.63 | 24 | 29.8 | 30 |
| | ID | | | | Diagonal | 0.95 | 227 | 106 | 0.27 | 0.43 | 27 | 31.7 | |
| | ID | | | | Longitudinal | 0.95 | 232 | 112 | 0.26 | 0.78 | 23 | 28.5 | |
| | | | | | | | 5 Days of natural ageing | | | | | | |
| 127622 | ID | 547 | 8s | 70 | Transverse | 0.95 | 227 | 106 | 0.30 | 0.67 | 24 | 30.2 | 29 |
| | ID | | | | Diagonal | 0.95 | 230 | 107 | 0.31 | 0.37 | 27 | 32.0 | |
| | ID | | | | Longitudinal | 0.95 | 226 | 111 | 0.30 | 0.75 | 22 | 27.5 | |
| | OD | | | | Transverse | 0.95 | 227 | 110 | 0.29 | 0.66 | 24 | 30.1 | 30 |
| | OD | | | | Diagonal | 0.95 | 231 | 117 | 0.31 | 0.31 | 27 | 32.7 | |
| | OD | | | | Longitudinal | 0.95 | 238 | 119 | 0.28 | 0.77 | 22 | 27.1 | |
| 127602 | ID | 539 | No Soak | 75 | Transverse | 0.96 | 219 | 101 | 0.30 | 0.52 | 30 | 30 | 30 |
| | ID | | | | Diagonal | 0.95 | 231 | 107 | 0.30 | 0.77 | 25 | 26 | |
| | ID | | | | Longitudinal | 0.96 | 225 | 103 | 0.30 | 0.37 | 31 | 31 | |
| | OD | | | | Transverse | 0.95 | 223 | 102 | 0.31 | 0.67 | 30 | 30 | |
| | OD | | | | Diagonal | 0.93 | 228 | 107 | 0.30 | 0.80 | 28 | 28 | |
| | OD | | | | Longitudinal | 0.95 | 226 | 103 | 0.30 | 0.37 | 33 | 33 | |
| 127631 | ID | 547 | 8s | 62 | Transverse | | | | | | | | 31 |
| | ID | | | | Diagonal | 0.95 | 231 | 111 | 0.31 | 0.71 | 30 | 30 | |
| | OD | | | | Transverse | 0.95 | 242 | 117 | 0.30 | 0.81 | 28 | 28 | |
| | OD | | | | Longitudinal | 0.95 | 235 | 112 | 0.30 | 0.40 | 33 | 33 | |

FIGURE 21

Table 8

| Coil # | Sample Location | YS (MPa) | 0% Pre-Strain | 5% Pre-Strain | 10% Pre-Strain | 15% Pre-Strain |
|---|---|---|---|---|---|---|
| 0127619 | ID | 120 | 0 | 0 | 1 | 2 |
| | | 114 | 0 | 0 | 0 | 1 |
| | | 111 | 0 | 0 | 0 | 0 |
| | OD | 121 | 0 | 0 | 2 | 2 |
| | | 115 | 0 | 0 | 1 | 2 |
| | | 113 | 0 | 0 | 0 | 0 |

FIGURE 22

Table 9

| Coil # | Sample Location | Pre-strain | Direction | Specimen 1 | Specimen 2 | Specimen 3 | Average |
|---|---|---|---|---|---|---|---|
| 0127622 | ID | 5% | Longitudinal | 0 | 0 | 0 | 0 |
| | ID | 5% | Diagonal | 0 | 0 | 0 | 0 |
| | ID | 5% | Transverse | 0 | 0 | 0 | 0 |
| | ID | 10% | Longitudinal | 1 | 1 | 1 | 1 |
| | ID | 10% | Diagonal | 0 | 0 | 0 | 0 |
| | ID | 10% | Transverse | 1 | 1 | 1 | 1 |
| | ID | 15% | Longitudinal | 2 | 2 | 2 | 2 |
| | ID | 15% | Diagonal | 0 | 0 | 0 | 0 |
| | ID | 15% | Transverse | 0 | 0 | 0 | 0 |
| | OD | 5% | Longitudinal | 0 | 0 | 0 | 0 |
| | OD | 5% | Diagonal | 0 | 1 | 1 | 0.7 |
| | OD | 10% | Transverse | 1 | 0 | 0 | 0 |
| | OD | 10% | Longitudinal | 0 | 1 | 1 | 0.3 |
| | OD | 15% | Diagonal | 1 | 1 | 1 | 1 |
| | OD | 15% | Transverse | 0 | 0 | 0 | 0 |

FIGURE 23

Table 10

| Coil # | Sample Location | Pre-strain | Direction | Specimen 1 | Specimen 2 | Specimen 3 | Average |
|---|---|---|---|---|---|---|---|
| 0127602 | ID | 5% | Longitudinal | 1 | 1 | 1 | 1.0 |
| | | | Diagonal | 1 | 1 | 1 | 1.0 |
| | | | Transverse | 0 | 0 | 0 | 0.0 |
| | ID | 10% | Longitudinal | 1 | 1 | 1 | 1.0 |
| | | | Diagonal | 1 | 1 | 2 | 1.3 |
| | | | Transverse | 0 | 0 | 0 | 0.0 |
| | ID | 15% | Longitudinal | 1 | 1 | 2 | 1.3 |
| | | | Diagonal | 2 | 2 | 2 | 2.0 |
| | | | Transverse | 0 | 0 | 1 | 0.3 |
| | OD | 5% | Longitudinal | 1 | 1 | 1 | 1.0 |
| | | | Diagonal | 1 | 1 | 1 | 1.0 |
| | | | Transverse | 0 | 0 | 0 | 0.0 |
| | OD | 10% | Longitudinal | 1 | 1 | 1 | 1.0 |
| | | | Diagonal | 2 | 2 | 2 | 1.7 |
| | | | Transverse | 0 | 0 | 0 | 0.0 |
| | OD | 15% | Longitudinal | 2 | 2 | 2 | 2.0 |
| | | | Diagonal | 2 | 2 | 2 | 2.0 |
| | | | Transverse | 1 | 1 | 0 | 0.7 |

FIGURE 24

Table 11

| Coil # | Sample Location | Pre-strain | Direction | Specimen 1 | Specimen 2 | Specimen 3 | Average |
|---|---|---|---|---|---|---|---|
| 0127681 | OD | 5% | Longitudinal | 1 | 1 | 2 | 1.3 |
| | | | Diagonal | 2 | 1 | 1 | 1.3 |
| | | | Transverse | 0 | 0 | 0 | 0.0 |
| | OD | 10% | Longitudinal | 2 | 2 | 1 | 1.7 |
| | | | Diagonal | 2 | 2 | 2 | 2.0 |
| | | | Transverse | 1 | 0 | 0 | 0.3 |
| | OD | 15% | Longitudinal | 2 | 2 | 2 | 2.0 |
| | | | Diagonal | 2.5 | 2 | 2.5 | 2.3 |
| | | | Transverse | 1 | 1 | 0 | 0.7 |

FIGURE 25

Table 12

| Coils | Sample Location (ID/OD) | Solutionizing Conditions | | | Direction | Gauge (mm) | Strength MPa | | n value (10-20%) | R (10%) Value | Elongation % | | |
|---|---|---|---|---|---|---|---|---|---|---|---|---|---|
| | | PMT | Soak above 540°C | RMT °C | | | UTS | YS | | | Uniform | Total | Avg* |
| | | | | | | | 28 Days of natural ageing | | | | | | |
| 127619 | OD | 543 | 8s | 85 | transversal | 0.95 | 252 | 133 | 0.27 | 0.78 | 22.0 | 22.8 | 29 |
| | OD | | | | Diagonal | 0.95 | 246 | 128 | 0.27 | 0.43 | 24.7 | 29.4 | |
| | OD | | | | Longitudinal | 0.95 | 235 | 125 | 0.27 | 0.64 | 23.0 | 28.0 | |
| | | | | | | | 24 Days of natural ageing | | | | | | |
| 127622 | ID | 547 | 8s | 75 | transversal | 0.95 | 250 | 130 | 0.29 | 0.79 | 22 | 27 | 29 |
| | ID | | | | Diagonal | 0.95 | 243 | 123 | 0.28 | 0.37 | 26 | 31 | |
| | ID | | | | Longitudinal | 0.95 | 239 | 121 | 0.28 | 0.64 | 23 | 28 | |
| | OD | | | | transversal | 0.95 | 249 | 129 | 0.28 | 0.78 | 22 | 27 | 30 |
| | OD | | | | Diagonal | 0.95 | 243 | 123 | 0.28 | 0.37 | 27 | 33 | |
| | OD | | | | Longitudinal | 0.95 | 239 | 121 | 0.27 | 0.66 | 23 | 29 | |
| | | | | | | | 45 Days of natural ageing | | | | | | |
| 127631 | ID | 547 | 8s | 65 | transversal | 0.95 | 240 | 122 | 0.28 | 0.66 | 23 | 28 | 28 |
| | ID | | | | Diagonal | 0.96 | 243 | 123 | 0.27 | 0.37 | 25 | 31 | |
| | ID | | | | Longitudinal | 0.95 | 251 | 129 | 0.28 | 0.79 | 22 | 27 | |
| | OD | | | | transversal | 0.95 | 243 | 125 | 0.28 | 0.69 | 23 | 29 | |
| | OD | | | | Diagonal | 0.95 | 242 | 125 | 0.28 | 0.32 | 26 | 31 | |
| | OD | | | | Longitudinal | 0.95 | 239 | 120 | 0.28 | 0.80 | 21 | 27 | |
| 127632 | ID | 530 | No Soak | 75 | transversal | 0.96 | 236 | 121 | 0.28 | 0.63 | 23 | 28 | 27 |
| | ID | | | | Diagonal | 0.95 | 241 | 121 | 0.28 | 0.35 | 24 | 31 | |
| | ID | | | | Longitudinal | 0.95 | 240 | 125 | 0.28 | 0.83 | 21 | 27 | |
| | OD | | | | transversal | 0.95 | 239 | 121 | 0.28 | 0.64 | 23 | 28 | |
| | OD | | | | Diagonal | 0.95 | 242 | 123 | 0.27 | 0.28 | 26 | 31 | |
| | OD | | | | Longitudinal | 0.95 | 231 | 127 | 0.28 | 0.78 | 21 | 27 | |

FIGURE 26

Table 13

| Coil # | Sample Location | Solutionizing Conditions PMT | Soak | RMT °C | Direction | Gauge (mm) | Strength MPa UTS | YS | n value (10-20%) | R (10%) Value | Elongation % Uniform | Total | Avg.* |
|---|---|---|---|---|---|---|---|---|---|---|---|---|---|
| 127619 | OD | 543 | 8s | 85 | Transversal | 0.95 | 306 | 229 | 0.18 | 0.73 | 18 | 23 | 25 |
|  | OD |  |  |  | Diagonal | 0.95 | 295 | 223 | 0.18 | 0.45 | 20 | 26 |  |
|  | OD |  |  |  | Longitudinal | 0.95 | 288 | 217 | 0.18 | 0.58 | 19 | 25 |  |
| | | | | | | | 20 Days of natural ageing | | | | | | |
| 127622 | ID | 547 | 8s | 75 | transversal | 0.95 | 301 | 222 | 0.19 | 0.78 | 17.5 | 23.1 | 26 |
|  | ID |  |  |  | Diagonal | 0.95 | 290 | 214 | 0.19 | 0.38 | 20.7 | 27.0 |  |
|  | ID |  |  |  | Longitudinal | 0.95 | 286 | 210 | 0.19 | 0.67 | 19.0 | 25.1 |  |
|  | OD |  |  |  | transversal | 0.95 | 301 | 222 | 0.18 | 0.77 | 17.6 | 23.4 |  |
|  | OD |  |  |  | Diagonal | 0.95 | 290 | 215 | 0.19 | 0.38 | 20.1 | 26.0 |  |
|  | OD |  |  |  | Longitudinal | 0.95 | 287 | 212 | 0.19 | 0.67 | 18.8 | 24.7 |  |
| | | | | | | | 24 Days of natural ageing | | | | | | |
| 127681 | ID | 547 | 8s | 65 | transversal | 0.95 | 283 | 206 | 0.19 | 0.67 | 19 | 25 | 25 |
|  | ID |  |  |  | Diagonal | 0.95 | 284 | 209 | 0.19 | 0.33 | 20 | 26 |  |
|  | ID |  |  |  | Longitudinal | 0.95 | 297 | 218 | 0.19 | 0.79 | 18 | 24 |  |
|  | OD |  |  |  | transversal | 0.95 | 296 | 202 | 0.19 | 0.20 | 23 | 24 |  |
|  | OD |  |  |  | Diagonal | 0.95 | 285 | 207 | 0.19 | 0.41 | 25 | 28 |  |
|  | OD |  |  |  | Longitudinal | 0.95 | 281 | 215 | 0.19 | 0.73 | 25 | 26 |  |
| | | | | | | | 45 Days of natural ageing | | | | | | |
| 127602 | ID | 539 | No Soak | 75 | Transversal | 0.95 | 286 | 217 | 0.18 | 0.72 | 17 | 23 | 25 |
|  | ID |  |  |  | Diagonal | 0.95 | 283 | 210 | 0.18 | 0.37 | 20 | 26 |  |
|  | ID |  |  |  | Longitudinal | 0.95 | 284 | 208 | 0.19 | 0.69 | 19 | 25 |  |
|  | OD |  |  |  | Transversal | 0.95 | 283 | 206 | 0.18 | 0.69 | 19 | 25 | 24 |
|  | OD |  |  |  | Diagonal | 0.95 | 285 | 209 | 0.18 | 0.36 | 20 | 26 |  |
|  | OD |  |  |  | Longitudinal | 0.95 | 297 | 215 | 0.18 | 0.79 | 17 | 23 |  |

FIGURE 27

Table 14

| Coil # | Direction | Natural Ageing Days | Sample Location | YS (MPa) | 0% | 5% | 10% | 15% |
|---|---|---|---|---|---|---|---|---|
| 0127619 | 0 | 28 | OD | 131 | 0 | 2 | 2 | 2 |
|  | 45 |  |  | 126 | 0 | 1 | 2 | 2 |
|  | 90 |  |  | 124 | 0 | 0 | 0 | 0 |
|  | 0 |  | ID | 130 | 0 | 1 | 2 | 2 |
|  | 45 |  |  | 124 | 0 | 1 | 2 | 2 |
|  | 90 |  |  | 120 | 0 | 0 | 0 | 0 |
| 0127622 | 0 | 26 | Middle | - | - | 0 | 1 | 1 |
|  | 45 |  |  | - | - | 1 | 2 | 3 |
|  | 90 |  |  | - | - | 0 | 0 | 0 |
|  | 0 | 90 | Middle | - | - | 1 | 2 | 2 |
|  | 45 |  |  | - | - | 1 | 2 | 3 |
|  | 90 |  |  | - | - | 0 | 0 | 0 |
| 0127681 | 0 | 45 | ID | - | - | 1 | 2 | 2 |
|  | 45 |  |  | - | - | 1 | 2 | 3 |
|  | 90 |  |  | - | - | 0 | 0 | 0 |
|  | 0 |  | OD | - | - | 1 | 2 | 2 |
|  | 45 |  |  | - | - | 1 | 2 | 3 |
|  | 90 |  |  | - | - | 0 | 0 | 0 |
| 0127602 | 0 | 45 | ID | - | - | 0 | 1 | 2 |
|  | 45 |  |  | - | - | 1 | 2 | 3 |
|  | 90 |  |  | - | - | 0 | 0 | 0 |
|  | 0 |  | OD | - | - | 1 | 1 | 2 |
|  | 45 |  |  | - | - | 1 | 2 | 3 |
|  | 90 |  |  | - | - | 0 | 0 | 0 |

FIGURE 28

HIGHLY FORMABLE AUTOMOTIVE ALUMINUM SHEET WITH REDUCED OR NO SURFACE ROPING AND A METHOD OF PREPARATION

CROSS-REFERENCE TO RELATED APPLICATION

This application claims the benefit of U.S. Provisional Application No. 62/102,124, filed Jan. 12, 2015, which is incorporated herein by reference in its entirety.

FIELD

The present invention relates to the fields of material science, material chemistry, metallurgy, aluminum alloys, aluminum fabrication, the transportation industry, the motor vehicle industry, the automotive industry, motor vehicle fabrication and related fields. The present invention relates to highly formable automotive aluminum sheet products with reduced or no roping. The present invention also relates to a method of producing the aluminum sheet products. In particular, these products have application in the automotive industry.

BACKGROUND

The automotive industry, in order to reduce the weight of automobiles, has increasingly substituted aluminum alloy panels for steel panels. Lighter weight panels help reduce automobile weight, which reduces fuel consumption. However, the introduction of aluminum alloy panels creates its own set of needs. To be useful in automobile applications, an aluminum alloy sheet product must possess good forming characteristics in the as-received T4 temper condition, so that it may be bent or shaped as desired without cracking, tearing or wrinkling. At the same time, the alloy panel, after painting and baking, must have sufficient strength to resist dents and withstand other impacts.

In addition to the requirements discussed above, another requirement is that the aluminum alloys for automotive components do not have objectionable and/or deleterious surface defects referred to as ridging, roping, or paint brush lines, which appear on the surface of stamped or formed aluminum sheet components. The ridging or roping lines appear in the rolling direction only upon application of sufficient transverse strain, such as that occurring in typical stamping or forming operations.

This roping defect is of sufficient severity that it is visible in the automotive component after painting. Consequently, the finished surface appearance of these aluminum alloys is objectionable and not suitable for exterior automotive applications. This roping defect may also serve as a strain concentration site during forming, thus limiting formability.

In addition, known processes for making 6xxx series sheet material suitable for automotive outer panels have involved a rather complex, expensive, and slow procedure generally involving the following steps: semi-continuous direct chill (DC) casting of the molten alloy to form an ingot, scalping of the ingot, homogenizing the ingot for time periods between 1 to 48 hours, hot rolling, self-annealing, and cold rolling to the desired gauge. The rolled material may then be given a solution heat treatment in a continuous heat treatment line, rapidly cooled and then aged.

Typically, the self-anneal process for automotive outer panels includes high exit temperatures which are required to meet roping requirements. High exit temperatures promote large soluble coarse particles, such as $Mg_2Si$ and copper containing particles. To achieve the desired combination of strengths in the as-supplied and paint bake tempers, continuous anneal solution heat treatment (CASH) lines must use high solutionizing temperatures and long soak times to dissolve the large soluble particles. These soluble particles are known to affect tensile properties in both T4 and paint bake tempers and also forming characteristics. The large soluble particles can ultimately decrease CASH line productivity to an unacceptable level. Additionally, the self-annealing process reduces the ability to differentiate alloys in terms of both T4 and paint bake strengths, despite significant differences in the alloy chemistries.

Inner and structural automotive products are generally produced from rerolls that are coiled at relatively lower temperatures. These products meet the tensile properties but not the roping requirements of outer products using lower CASH peak metal temperatures and soak times. Thus, metal sheets for inner/structural panels tend to run between 25-50% faster on the CASH line than metal sheets for outer panels. In this overall procedure, the processing of outer panels for automotive applications can take a substantially long solutionizing time, which reduces productivity of an expensive asset.

There is therefore a need for improved aluminum alloys that have reduced roping defects and for more efficient processes for fabricating sheet material from such alloys.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

The present invention solves the problems described above with a new process to increase productivity on the CASH line and provides heat-treatable automotive aluminum sheet products with high T4 and after-paint bake strengths and minimal or no roping. As a non-limiting example, the process of the present invention has particular application in the automotive industry. For example, outer panels used in truck cabs need both the good paint bake strength and roping free surface appearance. However, it is known that the heat treatable alloys and processes of the present invention may be applicable to the marine, aerospace, and transportation industries, just to name a few.

The alloys of the present invention can be used to make products in the form of extrusions, plates, sheets, and forgings.

BRIEF DESCRIPTION OF THE FIGURES AND TABLES

FIGS. 1a-d are representations of the unrecrystallized grain structure in the as hot rolled condition (FIG. 1a) and recrystallized grain structure after batch annealing at 375° C. (FIG. 1b), 400° C. (FIG. 1c), and 425° C. (FIG. 1d) for 1 hour each.

FIG. 2 is a representation of the larger $Mg_2Si$ particle size after self-annealing using the standard production practice.

The scanning electron microscopy (SEM) micrograph shows the relatively coarse Mg$_2$Si precipitates (dark particles indicated by the arrows) in the self-annealed coil.

FIG. 3 is a representation of the smaller Mg$_2$Si particle size after batch annealing at 400° C. for 1 hour. The SEM micrograph shows the fine Mg$_2$Si particles (dark particles indicated by the arrows) in a batch annealed coil.

FIG. 4 is a comparison of T4 tensile yield strengths (TYS in MPa) and ultimate yield strengths (UTS in MPa) of exemplary alloys after self-anneal (SA) and batch anneal (BA). In the inset, the test directions are indicated as follows: L=longitudinal, T=transverse, D=diagonal. Standard SA is a self-annealed reroll, a product off the hot mill where temperature and rolling conditions are such that a recrystallized sheet is produced. Reroll BA is a product where the batch annealing process step occurs at the reroll thickness. Inter BA is a product where the batch annealing process step occurs after at least one cold mill pass but before the final cold mill pass. The coil numbers shown in FIG. 4 are the same numbers and in the same order in FIGS. 5 and 6. The first histogram bar in each set represents TYS-L; the second histogram bar in each set represents TYS-T; the third histogram bar in each set represents TYS-D; the fourth histogram bar in each set represents UTS-L; the fifth histogram bar in each set represents UTS-T; and the sixth histogram bar in each set represents UTS-D.

FIG. 5 is a representation of tensile yield strength results (in MPa) tested in the transverse direction for the 180° C./20 min paint baking of the claimed alloys after self-anneal and batch anneal. The first histogram bar in each set represents after paint bake yield strength. The middle histogram bar in each set represents T4 yield strength. The right histogram bar in each set represents the difference between the after paint bake yield strength and the T4 yield strength.

FIG. 6 is a representation of tensile yield strength results (in MPa) tested in the transverse (T), longitudinal (L) and diagonal (D 45°) directions for the 180° C./60 min paint baking of the claimed alloys after self-anneal and batch anneal. The first histogram bar in each set represents the results in the longitudinal direction. The middle histogram bar in each set represents the results in the transverse direction. The right histogram bar in each set represents the results in the diagonal direction.

Figure 1B:
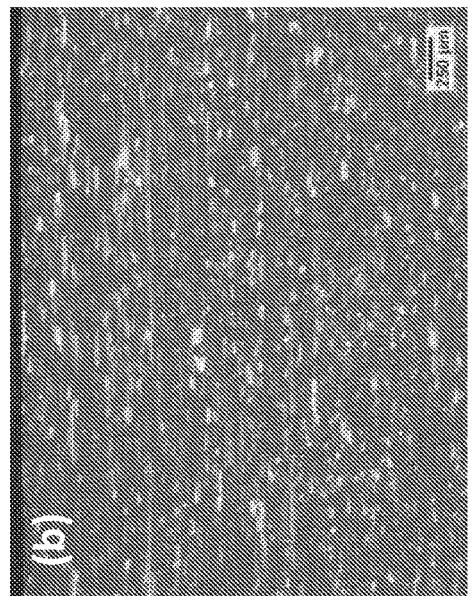
Figure 1D:
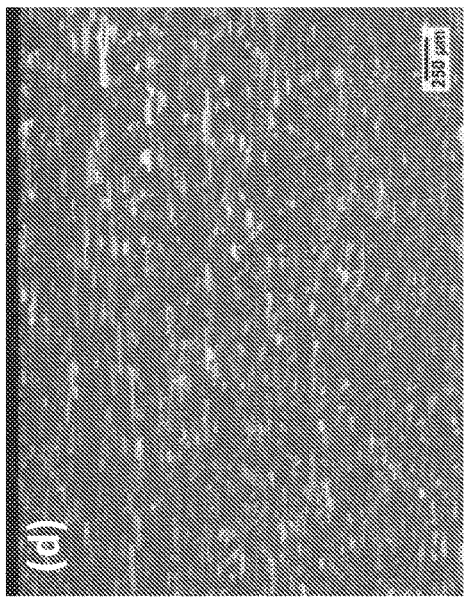
Figure 1A:
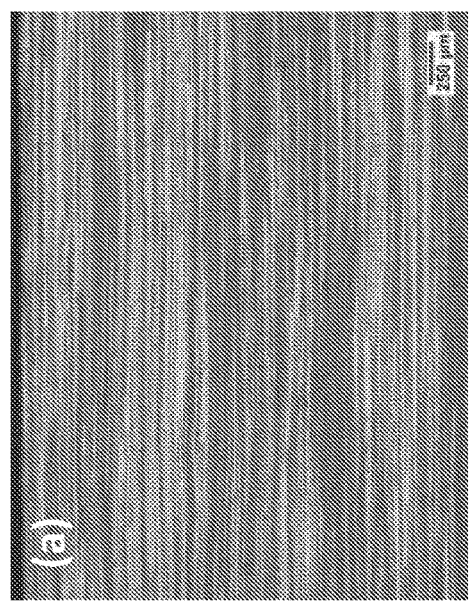
Figure 1C:
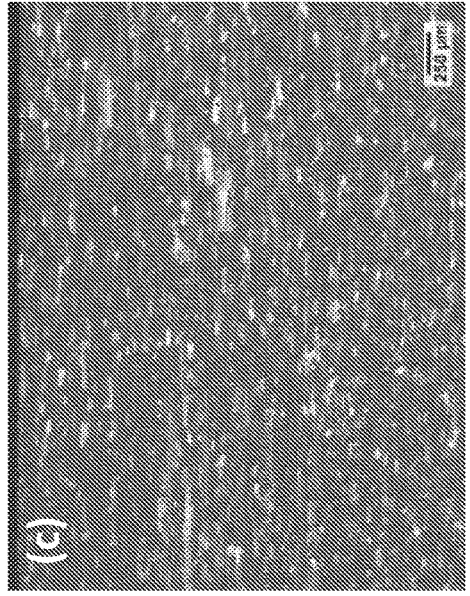

FIG. 15, Table 1 lists the mechanical properties of the T4 sheet and after paint baking (180° C./20 min and 180° C./60 min) of exemplary alloys after annealing.

FIG. 16, Table 2 lists the roping evaluation of the T4 sheet of exemplary alloys after self-anneal and batch anneal.

FIG. 17, Table 3 lists flat hem test ratings for self-annealed coil compared to the batch annealed material in T4 for 550° C./15 sec CASH followed by 60 days of natural aging.

FIG. 18, Table 4 lists flat hem test ratings for the batch annealed material in T4 with 10 and 15% pre-strain.

FIG. 19, Table 5 lists mechanical properties of T4 sheets from the trial coils.

FIG. 20, Table 6 lists mechanical properties of after paint bake conditions for the trial coils.

FIG. 21, Table 7 lists mechanical properties for sheets along the length of trial coils after 4 or 5 days of natural aging.

FIG. 22, Table 8 lists the bend ratings for coil 0127619 after 0% pre-strain, 5% pre-strain, 10% pre-strain, and 15% pre-strain.

FIG. 23, Table 9 lists the bend ratings for coil 0127622 after 5% pre-strain, 10% pre-strain, and 15% pre-strain.

FIG. 24, Table 10 lists the bend ratings for coil 0127602 after 5% pre-strain, 10% pre-strain, and 15% pre-strain.

FIG. 25, Table 11 lists the bend ratings for coil 0127681 after 5% pre-strain, 10% pre-strain, and 15% pre-strain.

FIG. 26, Table 12 lists mechanical properties of sheets from trial coils after 24-45 days of natural ageing.

FIG. 27, Table 13 lists mechanical properties of sheets from trial coils after 24-45 days of natural ageing and after paint baking.

FIG. 28, Table 14 lists the bend ratings for coils 0127619, 0127622, 0127681, and 0127602 after 0% pre-strain, 5% pre-strain, 10% pre-strain, and 15% pre-strain.

DETAILED DESCRIPTION

The present invention is directed to new processes to increase productivity on the CASH line for heat-treatable aluminum sheet products with high T4 and after-paint bake strengths which display acceptable roping. As a non-limiting example, the heat-treatable alloys of the present invention may be a 6xxx aluminum alloy. As another non-limiting example, the process of the present invention can be used in the automotive industry.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the term "heat-treatable alloy" is intended to refer broadly to any 2xxx, 6xxx, and 7xxx aluminum alloy.

As used herein, the meaning of "a," "an," and "the" includes singular and plural references unless the context clearly dictates otherwise.

In the following examples, the aluminum alloys are described in terms of their elemental composition in weight percent (wt. %). In each alloy, the remainder is aluminum, with a maximum wt. % of 0.15% for all impurities.

Alloys:

Described herein are novel 6xxx aluminum alloys. In one example, provided is an aluminum alloy comprising 0.20-1.0 wt. % Si, 0.11-0.40 wt. % Fe, 0.0-0.23 wt. % Cu, 0.0-0.22 wt. % Mn, 0.50-0.83 wt. % Mg, 0.0-0.25 wt. % Cr, 0.0-0.006 wt. % Ni, 0.0-0.15 wt. % Zn, 0.0-0.17 wt. % Ti, 0.0 to 0.05 wt. % Pb, 0.0 to 0.005 wt. % Be, up to 0.15 wt. % impurities, remainder Al.

In another example, provided is an aluminum alloy comprising 0.60-0.95 wt. % Si, 0.20-0.35 wt. % Fe, 0.05-0.20 wt. % Cu, 0.05-0.20 wt. % Mn, 0.55-0.75 wt. % Mg, 0.0-0.15 wt. % Cr, 0.0-0.006 wt. % Ni, 0.0-0.15 wt. % Zn, 0.0-0.15 wt. % Ti, 0.0 to 0.05 wt. % Pb, 0.0 to 0.005 wt. % Be, up to 0.15 wt. % impurities, remainder Al.

In some examples, an aluminum alloy as described herein includes silicon (Si) in an amount of from 0.20% to 1.0% (e.g., from 0.30% to 1.0%, from 0.60% to 0.95% or from 0.65% to 0.90%) based on the total weight of the alloy. For example, the alloy can include 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, 0.40%, 0.41%, 0.42%, 0.43%, 0.44%, 0.45%, 0.46%, 0.47%, 0.48%, 0.49%, 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, 0.83%, 0.84%, 0.85%, 0.86%, 0.87%, 0.88%, 0.89%, 0.90%, 0.91%, 0.92%, 0.93%, 0.94%, 0.95%, 0.96%, 0.97%, 0.98%, 0.99%, or 1.0% Si. All expressed in wt. %.

In some examples, an aluminum alloy as described herein includes iron (Fe) in an amount of from 0.11% to 0.40% (e.g., from 0.20% to 0.35% or from 0.25% to 0.30%) based on the total weight of the alloy. For example, the alloy can include 0.11%, 0.12%, 0.13%, 0.14%, 0.15%, 0.16%, 0.17%, 0.18%, 0.19%, 0.20%, 0.21%, 0.22%, 0.23%, 0.24%, 0.25%, 0.26%, 0.27%, 0.28%, 0.29%, 0.30%, 0.31%, 0.32%, 0.33%, 0.34%, 0.35%, 0.36%, 0.37%, 0.38%, 0.39%, or 0.40% Fe. All expressed in wt.

In some examples, an aluminum alloy as described herein includes copper (Cu) in an amount of from 0% to 0.23% (e.g., from 0.05% to 0.20% or from 0.1% to 0.15%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, 0.22%, or 0.23% Cu. In some cases, Cu is not present in the alloy (i.e., 0%). All expressed in wt.

In some examples, an aluminum alloy as described herein includes manganese (Mn) in an amount of from 0% to 0.22% (e.g., from 0.05 to 0.20% or from 0.1% to 0.15%) based on the total weight of the alloy. For example, the alloy can include 0.01%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, 0.17%, 0.18%, 0.19%, 0.20%, 0.21%, or 0.22% Mn. In some cases, Mn is not present in the alloy (i.e., 0%). All expressed in wt. %.

In some examples, an aluminum alloy as described herein includes magnesium (Mg) in an amount of from 0.50% to 0.83% (e.g., from 0.55% to 0.75% or from 0.60% to 0.70%) based on the total weight of the alloy. For example, the alloy can include 0.50%, 0.51%, 0.52%, 0.53%, 0.54%, 0.55%, 0.56%, 0.57%, 0.58%, 0.59%, 0.60%, 0.61%, 0.62%, 0.63%, 0.64%, 0.65%, 0.66%, 0.67%, 0.68%, 0.69%, 0.70%, 0.71%, 0.72%, 0.73%, 0.74%, 0.75%, 0.76%, 0.77%, 0.78%, 0.79%, 0.80%, 0.81%, 0.82%, or 0.83% Mg. All expressed in wt. %.

In some examples, an aluminum alloy as described herein includes chromium (Cr) in an amount of from 0% to 0.25% (e.g., from 0% to 0.15% or from 0.05% to 0.20%) based on the total weight of the alloy. For example, the alloy can include 0.010%, 0.011%, 0.012%, 0.013%, 0.014%, 0.015%, 0.016%, 0.017%, 0.018%, 0.019%, 0.020%, 0.021%, 0.022%, 0.023%, 0.024%, 0.025%, 0.026%, 0.027%, 0.028%, 0.029%, 0.030%, 0.031%, 0.032%, 0.033%, 0.034%, 0.035%, 0.036%, 0.037%, 0.038%, 0.039%, 0.040%, 0.041%, 0.042%, 0.043%, 0.044%, 0.045%, 0.046%, 0.047%, 0.048%, 0.049%, 0.050%, 0.051%, 0.052%, 0.053%, 0.054%, 0.055%, 0.056%, 0.057%, 0.058%, 0.059%, 0.060%, 0.061%, 0.062%, 0.063%, 0.064%, 0.065%, 0.066%, 0.067%, 0.068%, 0.069%, 0.070%, 0.071%, 0.072%, 0.073%, 0.074%, 0.075%, 0.076%, 0.077%, 0.078%, 0.079%, 0.080%, 0.081%, 0.082%, 0.083%, 0.084%, 0.085%, 0.086%, 0.087%, 0.088%, 0.089%, 0.090%, 0.091%, 0.092%, 0.093%, 0.094%, 0.095%, 0.096%, 0.097%, 0.098%, 0.099%, 0.10%, 0.11%, 0.12%, 0.13%, 0.14%, 0.15%, 0.16%, 0.17%, 0.18%, 0.19%, 0.20%, 0.21%, 0.22%, 0.23%, 0.24%, or 0.25% Cr. In some cases, Cr is not present in the alloy (i.e., 0%). All expressed in wt. %.

In some examples, an aluminum alloy as described herein includes nickel (Ni) in an amount of from 0% to 0.006% (e.g., from 0% to 0.005% or from 0.001% to 0.004%) based on the total weight of the alloy. For example, the alloy can include 0.001%, 0.002%, 0.003%, 0.004%, 0.005%, or 0.006% Ni. In some cases, Ni is not present in the alloy (i.e., 0%). All expressed in wt. %.

In some examples, an aluminum alloy as described herein includes zinc (Zn) in an amount of from 0% to 0.15% (e.g., from 0.01% to 0.15% or from 0.05% to 0.1%) based on the total weight of the alloy. For example, the alloy can include 0.01%, 0.011%, 0.012%, 0.013%, 0.014%, 0.015%, 0.016%, 0.017%, 0.018%, 0.019%, 0.02%, 0.03%, 0.04%, 0.05%, 0.06%, 0.07%, 0.08%, 0.09%, 0.10%, 0.11%, 0.12%, 0.13%, 0.14%, or 0.15% Zn. In some cases, Zn is not present in the alloy (i.e., 0%). All expressed in wt. %.

In some examples, an aluminum alloy as described herein includes titanium (Ti) in an amount of from 0% to 0.17% (e.g., from 0.01% to 0.15% or from 0.05% to 0.1%) based on the total weight of the alloy. For example, the alloy can include 0.01%, 0.011%, 0.012%, 0.013%, 0.014%, 0.015%, 0.016%, 0.017%, 0.018%, 0.019%, 0.02%, 0.03%, 0.04%, 0.05%, 0.06%, 0.07%, 0.08%, 0.09%, 0.10%, 0.11%, 0.12%, 0.13%, 0.14%, 0.15%, 0.16%, or 0.17% Ti. In some cases, Ti is not present in the alloy (i.e., 0%). All expressed in wt. %.

In some examples, an aluminum alloy as described herein includes lead (Pb) in an amount of from 0% to 0.05% (e.g., from 0% to 0.04% or from 0.001% to 0.01%) based on the total weight of the alloy. For example, the alloy can include 0.001%, 0.002%, 0.003%, 0.004%, 0.005%, 0.006%, 0.007%, 0.008%, 0.009%, 0.010%, 0.011%, 0.012%, 0.013%, 0.014%, 0.015%, 0.016%, 0.017%, 0.018%, 0.019%, 0.020%, 0.021%, 0.022%, 0.023%, 0.024%, 0.025%, 0.026%, 0.027%, 0.028%, 0.029%, 0.030%, 0.031%, 0.032%, 0.033%, 0.034%, 0.035%, 0.036%, 0.037%, 0.038%, 0.039%, 0.040%, 0.041%, 0.042%, 0.043%, 0.044%, 0.045%, 0.046%, 0.047%, 0.048%, 0.049%, or 0.050% Pb. In some cases, Pb is not present in the alloy (i.e., 0%). All expressed in wt. %.

In some examples, an aluminum alloy as described herein includes beryllium (Be) in an amount of from 0% to 0.005% (e.g., from 0% to 0.004% or from 0% to 0.001%) based on the total weight of the alloy. For example, the alloy can include 0.0001%, 0.0002%, 0.0003%, 0.0004%, 0.0005%, 0.0006%, 0.0007%, 0.0008%, 0.0009%, 0.001%, 0.002%, 0.003%, 0.004%, or 0.005% Be. In some cases, Be is not present in the alloy (i.e., 0%). All expressed in wt. %.

The 6xxx aluminum alloy may include a variety of tertiary elements, sometimes referred to herein as impurities, for various purposes, such as to enhance mechanical, physical or corrosion properties (e.g., strength, toughness, fatigue resistance, and/or corrosion resistance), to enhance properties at elevated temperatures, to facilitate casting, to control cast or wrought grain structure, and/or to enhance machinability, among other purposes. When present, these tertiary elements may include one or more of Ag, Li, Sn, Bi, Sr, Sb, V, Zr, Sc, Hf, Mo, Co, and rare earth elements. When present, a tertiary element is usually contained in the alloy in an amount of at most 0.05 wt. %. The sum of all tertiary elements does not exceed 0.15 wt. %. The remaining percentage of each alloy is aluminum.

Listed below are exemplary ranges for aluminum alloys as described herein. In the 6xxx aluminum alloy examples which follow, it is to be understood that the unstated remainder in each example is Al.

In one example, described herein is a 6xxx aluminum alloy comprising:

| Constituent | Range (wt. %) | Nominal (wt. %) |
| --- | --- | --- |
| Cu | 0-0.22 | 0.10 |
| Fe | 0.11-0.40 | 0.25 |
| Mg | 0.50-0.83 | 0.65 |
| Mn | 0-0.22 | 0.08 |
| Si | 0.20-1.0 | 0.80 |
| Ti | 0-0.17 | |
| Zn | 0-0.15 | |
| Cr | 0-0.25 | |
| Pb | 0-0.05 | |
| Be | 0-0.005 | |
| Trace element impurities | 0-0.15 | |

In another example, described herein is a 6xxx aluminum alloy comprising:

| Constituent | Range (wt. %) | Nominal (wt. %) |
| --- | --- | --- |
| Cu | 0.08-0.14 | 0.10 |
| Fe | 0.20-0.28 | 0.25 |
| Mg | 0.59-0.69 | 0.65 |
| Mn | 0.06-0.12 | 0.08 |
| Si | 0.72-0.84 | 0.80 |
| Ti | 0-0.05 | 0.013 |
| Zn | 0-0.05 | 0.015 |
| Cr | 0-0.08 | 0.012 |
| Pb | 0-0.05 | |
| Be | 0-0.005 | |
| Trace element impurities | 0-0.15 | |

In still another example, described herein is a 6xxx aluminum alloy comprising:

| Constituent | Range (wt. %) | Nominal (wt. %) |
| --- | --- | --- |
| Cu | 0.08-0.14 | 0.12 |
| Fe | 0.27-0.34 | 0.31 |
| Mg | 0.59-0.69 | 0.65 |
| Mn | 0.10-0.16 | 0.12 |
| Si | 0.74-0.84 | 0.82 |
| Ti | 0-0.05 | 0.03 |
| Zn | 0-0.05 | 0.01 |
| Cr | 0-0.050 | 0.042 |
| Pb | 0-0.05 | |
| Be | 0-0.005 | |
| Trace element impurities | 0-0.15 | |

In yet another example, described herein is a 6xxx aluminum alloy comprising:

| Constituent | Range (wt. %) | Nominal (wt. %) |
| --- | --- | --- |
| Cu | 0.14-0.20 | 0.16 |
| Fe | 0.26-0.32 | 0.32 |
| Mg | 0.58-0.69 | 0.65 |
| Mn | 0.12-0.19 | 0.16 |
| Si | 0.74-0.84 | 0.79 |
| Ti | 0-0.05 | 0.03 |
| Zn | 0-0.05 | 0.01 |
| Cr | 0-0.10 | 0.083 |
| Pb | 0-0.05 | |
| Be | 0-0.005 | |
| Trace element impurities | 0-0.15 | |

In another example, described herein is a 6xxx aluminum alloy comprising:

| Constituent | Range (wt. %) | Nominal (wt. %) |
| --- | --- | --- |
| Cu | 0.07-0.17 | 0.13 |
| Fe | 0.19-0.27 | 0.22 |
| Mg | 0.59-0.69 | 0.65 |
| Mn | 0.05-0.14 | 0.08 |
| Si | 0.56-0.65 | 0.62 |
| Ti | 0-0.08 | 0.04 |
| Zn | 0-0.05 | 0.02 |
| Cr | 0-0.08 | 0.08 |
| Pb | 0-0.05 | |
| Be | 0-0.005 | |
| Trace element impurities | 0-0.15 | |

In still another example, described herein is a 6xxx aluminum alloy comprising:

| Constituent | Range (wt. %) | Nominal (wt. %) |
|---|---|---|
| Cu | 0.15-0.19 | 0.16 |
| Fe | 0.28-0.32 | 0.29 |
| Mg | 0.61-0.71 | 0.65 |
| Mn | 0.09-0.15 | 0.13 |
| Si | 0.58-0.65 | 0.63 |
| Ti | 0-0.08 | 0.03 |
| Zn | 0-0.05 | 0.01 |
| Cr | 0-0.05 | 0.04 |
| Pb | 0-0.05 | |
| Be | 0-0.005 | |
| Trace element impurities | 0-0.15 | |

In yet another example, described herein is a 6xxx aluminum alloy comprising:

| Constituent | Range (wt. %) | Nominal (wt. %) |
|---|---|---|
| Cu | 0.19-0.23 | 0.19 |
| Fe | 0.26-0.32 | 0.30 |
| Mg | 0.61-0.69 | 0.67 |
| Mn | 0.15-0.19 | 0.16 |
| Si | 0.58-0.65 | 0.63 |
| Ti | 0-0.08 | 0.04 |
| Zn | 0-0.05 | 0.01 |
| Cr | 0-0.1 | 0.081 |
| Pb | 0-0.05 | |
| Be | 0-0.005 | |
| Trace element impurities | 0-0.15 | |

Properties:

The described 6xxx aluminum alloys have unexpectedly been found to possess a number of unique and favorable properties. It is known by persons of ordinary skill in the art that aluminum properties, such as, but not limited to, strength, elongation, bendability, and appearance, may be tailored by the process in which the aluminum sheet is made. It is also known that producing an aluminum sheet with several of these properties is difficult and unpredictable because increasing one property may decrease another property. However, the disclosed alloys display a combination of favorable properties without detrimentally affecting other properties of the aluminum sheets. For example, the disclosed alloys unexpectedly display both high strengths and suitable bendability. The following are non-limiting enhanced properties of the described alloys.

Figure 4:
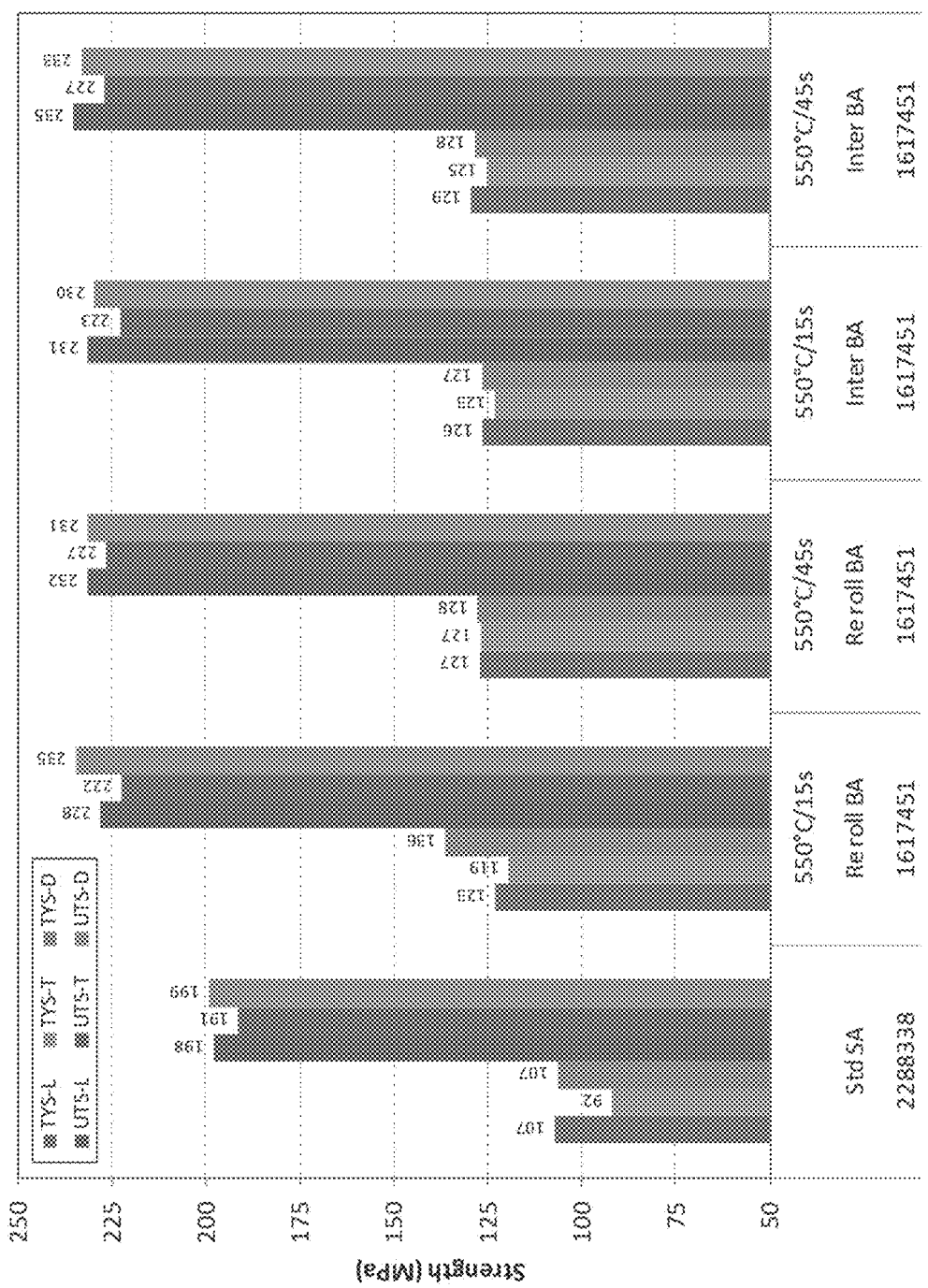

High T4 Strength:

The disclosed aluminum alloys may have a T4 yield strength of at least 100 MPa (e.g., at least 105 MPa, at least 110 MPa, at least 115 MPa, at least 120 MPa, at least 125 MPa, at least 130 MPa, at least 135 MPa, at least 140 MPa, or at least 145 MPa) and a T4 tensile strength of at least 200 MPa (e.g., at least 205 MPa, at least 210 MPa, at least 215 MPa, at least 220 MPa, at least 225 MPa, at least 230 MPa, at least 235 MPa, at least 240 MPa, at least 245 MPa, at least 250 MPa, or at least 255 MPa) after batch annealing. This equates to about 25 MPa higher yield strength and about 35 MPa higher tensile strength over self-annealed alloys of the present invention under similar solutionizing conditions, as shown in FIG. 4. Additionally, another advantage is that the batch annealed sheet exhibits similar yield strengths in a variety of solutionizing conditions, suggesting that the $Mg_2Si$ particles are fine enough to dissolve at lower peak metal temperature unlike the self-annealed products. In essence, the present process is suitable for differentiating the alloy chemistry effects better than the self-annealed product.

Figure 5:
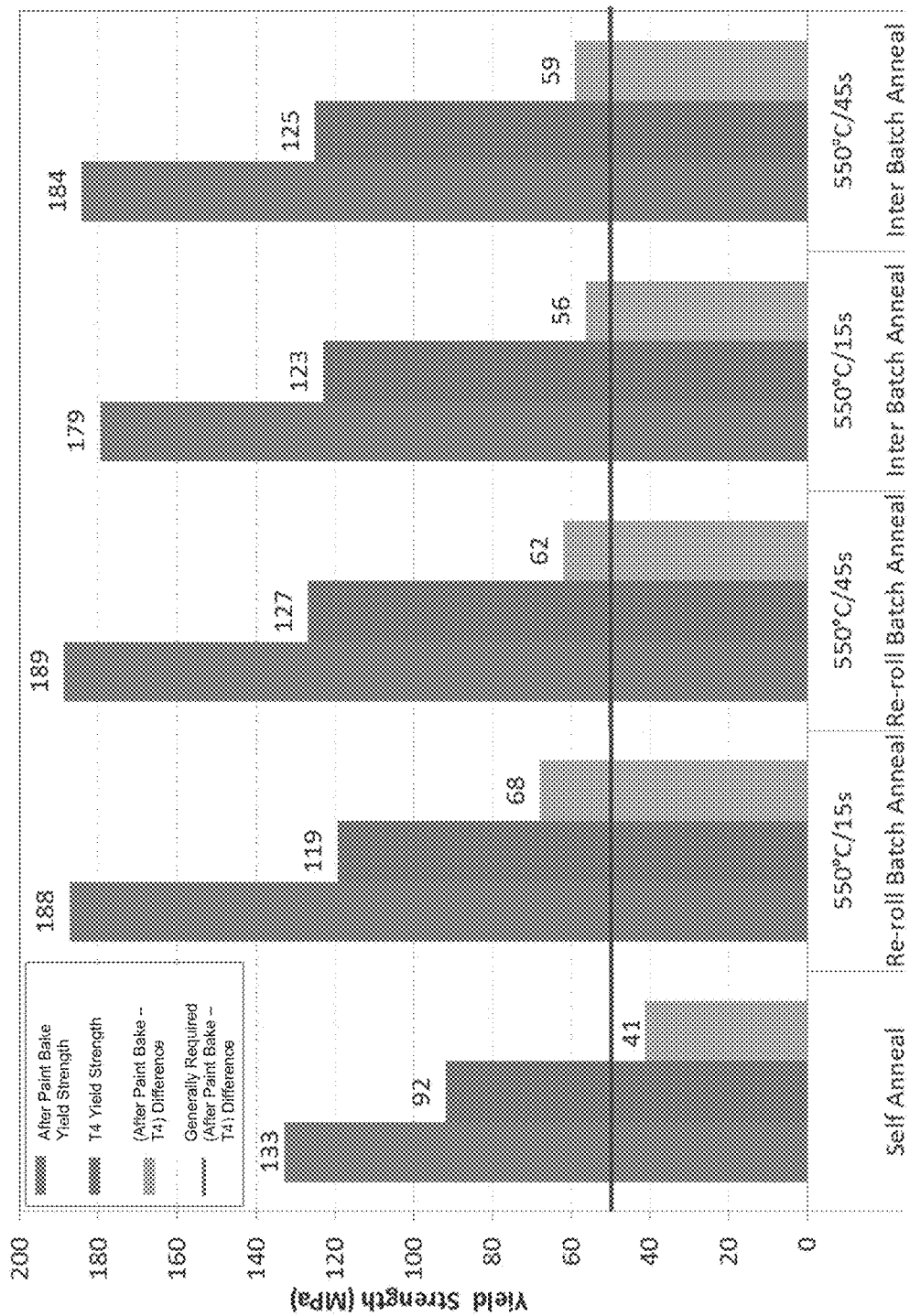
Figure 6:
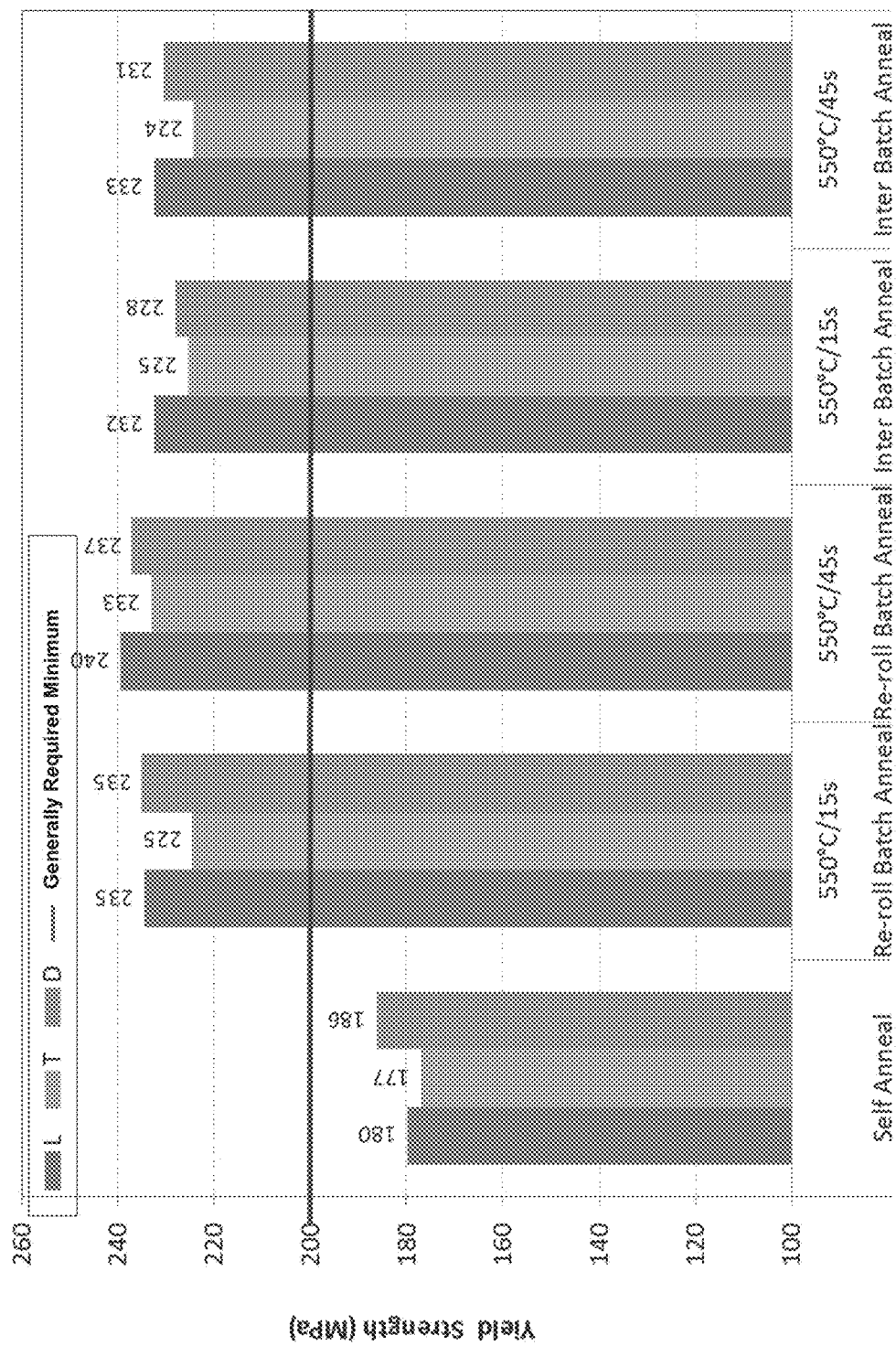

High after-Paint Bake Strength:

The disclosed aluminum alloys may have an after paint bake yield strength of at least 160 MPa (e.g., at least 165 MPa, at least 170 MPa, at least 175 MPa, at least 180 MPa, at least 185 MPa, at least 190 MPa, or at least 200 MPa) after batch annealing for paint bake condition of 180° C. for 20 minutes. This equates to about 45 MPa to 55 MPa higher yield strength over self-annealed alloys, as shown in FIG. 5. The yield strength difference of 50 MPa between the after paint bake and T4 conditions is met very easily by the inventive alloy and process as shown in FIG. 5. Similarly, the after paint bake strength for the paint bake condition of 180° C. for 60 minutes is shown in FIG. 6. Compared to the standard self-annealed material, a significantly higher response to paint baking in the inventive alloy and process can be seen. The new alloy and process combination allows for materials that exceed the minimum strength required by the customer. FIG. 15, Table 1 lists the mechanical properties for both the solution heat treated (T4) and after paint baked conditions for the both the standard and inventive alloy and process.

Bendability:

The disclosed aluminum alloys display high bendability. The bendability can be assessed by the bend angle. The aluminum alloys described herein can have bend angles less than about 10° in the T4 temper. For example, the aluminum alloys described herein can have bend angles less than about 9°, less than about 8°, less than about 7°, less than about 6°, less than about 5°, less than about 4°, less than about 3°, less than about 2°, or less than about 1° in the T4 temper.

Reduced Roping:

After solution heat treatment at 550° C. for 15 seconds and 45 seconds, the disclosed aluminum alloys showed significantly better roping compared to the self-annealed alloy. Roping was measured by first stretching the sheet 10% and then roughing the surface with a sharpening stone to highlight the features of interest. Sheet samples were then compared against standards. Shown in FIG. 8 and FIG. 16, Table 2 are the results of the roping test and the roping rating scale used.

Improved Flat Hemming Performance:

After solution heat treatment at 550° C. for 15 seconds, the disclosed aluminum alloys showed a flat hemming response similar to or better than the self-annealed alloy as shown in FIG. 17, Table 3. Hem testing was conducted after pre-straining the sheet by 7% and 15% in all three directions. The hemmed samples were then compared against standards and assigned ratings based on the hem appearance.

Faster CASH Speed:

As discussed herein, a low exit temperature after the last hot rolling pass followed by a batch annealing process produces significantly smaller $Mg_2Si$ particles compared to the self-annealed material (see FIGS. 2 and 3), which in turn allows for faster CASH speeds. The process described herein increases the CASH capacity, speed, and efficiency, just to name a few, by at least 10%, at least 15%, at least 20%, or at least 25%.

Process:

Also disclosed is a novel process for producing 6xxx series aluminum alloy products that involves at least a combination of hot rolling exit temperatures of no more than 300° C. and annealing (e.g., batch annealing), both at reroll and intermediate gauge. Further, the process described herein provides 6xxx aluminum alloy products having significantly higher T4 and after-paint bake strengths, better roping control, faster CASH line speed, and improved hemmability.

In one example, the process described herein involves homogenization, hot rolling, cold rolling, annealing (e.g., batch annealing), cold rolling, and CASH. In another example, the process described herein involves homogenization, hot rolling (a—after exit temperature coiling, immediately placing into an anneal furnace; b—after exit temperature coiling, cooling to room temperature and then placing into an anneal furnace), annealing (e.g., batch annealing), cold rolling, and CASH.

Homogenization:

Ingot homogenization may include, but is not limited to, heating the ingot between 500-600° C. (e.g., 500° C., 510° C., 520° C., 530° C., 540° C., 550° C., 560° C., 570° C., 580° C., 590° C., or 600° C.) for up to 10 hours. For example, the ingot can be heated for 10 hours or less, 9 hours or less, 8 hours or less, 7 hours or less, 6 hours or less, 5 hours or less, 4 hours or less, 3 hours or less, 2 hours or less, or 1 hour or less. In one embodiment, the ingot is heated at 560° C. for >6 hours and then heated at 540° C. >1 hours. The ingot may be prepared by various casting methods, such as by direct chill casting (DC).

Hot Rolling:

During hot rolling, temperatures and other operating parameters may be controlled so that the temperature of the aluminum alloy hot rolled intermediate product upon exit from the hot rolling mill is no more than 300° C., no more than 290° C., no more than 280° C., or no more than 270° C. In one example, the exit temperature is about 260° C. In one example, the exit temperature is about 250° C. In another example, the exit temperature is about 240° C. In yet another example, the exit temperature is about 230° C. In still another example, the exit temperature is about 220° C.

The ingot may be hot rolled between about 200° C. to 500° C. For example, the ingot may be hot rolled at a temperature ranging from about 225° C. to 475° C., from about 250° C. to 450° C., from about 275° C. to 425° C., or from about 300° C. to 400° C. The hot rolled sheet may have a gauge of 10 mm or less (e.g., between 3-10 mm). For example, the hot rolled sheet can have a gauge of 10 mm or less, 9 mm or less, 8 mm or less, 7 mm or less, 6 mm or less, 5 mm or less, 4 mm or less, or 3 mm or less.

As described herein, controlling the exit temperature of the hot rolling step provides the desired microstructure, i.e., inhibits precipitation of large, coarse $Mg_2Si$ particles, which when further processed, provides a product with high T4 and after-paint bake strengths, better roping, and faster CASH speed.

Controlling the exit temperature of the hot rolled aluminum alloy intermediate product can be done in any conventional manner, such as through control of the hot mill operating conditions, such as the extent of cooling lubricant, rolling speed, or time delays between the various steps on a typical hot mill. The temperature of the hot rolled intermediate product can then be monitored using known techniques, such as by contact thermocouples or optical pyrometer. The monitored hot mill exit temperature can be used in a feedback control manner in conjunction with cooling the slabs or controlling temperatures during hot rolling using cooling lubricants, mill speeds, or the like as described above. That is, the mill exit temperature can dictate adjustment in the rolling operation to maintain the exit temperature within the specified range.

Batch Annealing:

Batch annealing, either at hot band gauge or some intermediate gauge in the cold rolling process, can generate a suitable texture for a product with little or no roping. During heating of coils in the batch annealing step, the microstructure becomes populated with a high density of relatively finer soluble particles, such as $Mg_2Si$. These fine precipitates produce a desired combination of tensile properties in the as-supplied temper (T4) and paint bake tempers together with excellent roping and hemming characteristics in the final product with relatively lower temperature and soak time heat treatment requirements on a solution heat treatment line compared to the conventional self-annealed product.

During batch annealing, the coiled aluminum sheet may be heated at a rate of from about 40° C./hour to 60° C./hour (e.g., 40° C./hour, 45° C./hour, 50° C./hour, 55° C./hour, or 60° C./hour) to a temperature of between about 350° C. to 450° C. (e.g., 350° C., 360° C., 370° C., 380° C., 390° C., 400° C., 410° C., 420° C., 430° C., 440° C., or 450° C.).

In some cases, the aluminum sheet may be heated at a rate of about 50° C./hour to a temperature of about 400° C. The hold time may be up to 1 hour, up to 2 hours, up to 3 hours, up to 4 hours, or up to 5 hours. In one example, the hold time is 2 hours. In one example, the aluminum sheet may then be cooled at a rate of from at least 5° C./hour to room temperature. In another example, the aluminum sheet may be cooled at a rate of at least 7° C./hour to room temperature. In one example, the aluminum sheet may be cooled at a rate of at least 9° C./hour to room temperature. In another example, the aluminum sheet may be cooled at a rate of at least 10° C./hour to room temperature. It should be understood that the annealing process should not be limited to batch annealing. The annealing process can also include continuous annealing. For example, the sheet can be continuously annealed by passing the sheet through a continuous anneal solution heat (CASH) line.

Cold Rolling:

The aluminum sheet may be cold rolled using conventional cold rolling mills and technology. The cold rolled sheet may have a gauge between 0.5-4.5 mm, between 0.7-4.0 mm, or between 0.9-3.5 mm. In one example, the cold rolled sheet has a gauge of about 1.0 mm. In another example, the cold rolled sheet has a gauge of about 0.8 mm. In yet another example, the cold rolled sheet has a gauge of about 1.2 mm. The amount of cold worked reduction may be up to 65%, up to 70%, up to 75%, up to 80% or up to 85%.

Continuous Anneal Solution Heat (CASH) Treatment:

The solution heat treatment may be any conventional treatment for the alloy which results in solutionizing of the soluble particles. The aluminum sheet may be heated to a peak metal temperature ranging from about 500° C. to 580° C. (e.g., 500° C., 510° C., 520° C., 530° C., 540° C., 550° C., 560° C., 570° C., or 580° C.) and soaked (i.e., held at the indicated temperature) for a period of time above a predetermined temperature. In some examples, the sheets are allowed to soak for up to about 10 minutes (e.g., from 1 second to 10 minutes, inclusively). For example, the sheet can be soaked for about 5 seconds or less, 10 seconds or less, 15 seconds or less, 30 seconds or less, 45 seconds or less, 1 minute or less, 2 minutes or less, 3 minutes or less, 4 minutes or less, 5 minutes or less, 6 minutes or less, 7 minutes or less, 8 minutes or less, 9 minutes or less, or 10 minutes or less. Exemplary conditions for the solution heat treatment include soak times of 30 seconds or 60 seconds at temperatures above 540° C. In one example, the aluminum alloy is heated to 550° C. with the strip held above 540° C. for 15 or 45 seconds. After heating and soaking, the strip is rapidly cooled at rates greater than 10° C./s (e.g., 15° C./s or greater, 20° C./s or greater, or 25° C./s or greater) to a temperature between 500-200° C. In one example, the aluminum alloy has a quench rate of above 20° C./second where the strip is cooled between 450-250° C. Cooling rates may be faster in other examples.

After quenching, the aluminum strip may be subjected to a reheating step before being coiled. The reheating step can be carried out by passing the sheet through a heating device consisting of radiant heating, convective heating, induction heating, or infrared heating, etc. The step of reheating the sheet to allow strip coiling can be performed at a temperature ranging from about 55° C. to 110° C. (e.g., 55° C., 60° C., 65° C., 70° C., 75° C., 80° C., 85° C., 90° C., 95° C., 100° C., 105° C., or 110° C.).

The alloys and methods described herein can be used in automotive, marine, aerospace, and/or transportation applications, just to name a few. In some cases, the alloys and methods can be used to prepare motor vehicle body part products, including outer panels.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention. During the studies described in the following examples, conventional procedures were followed, unless otherwise stated. Some of the procedures are described below for illustrative purposes.

EXAMPLES

Example 1

Preparation of Aluminum Sheets

Five samples containing 98.03-98.06 wt. % Al, 0.78-0.83 wt. % Si, 0.22-0.24 wt. % Fe, 0.10-0.11 wt. % Cu, 0.08-0.09 wt. % Mn, 0.64-0.65 wt. % Mg, 0.015-0.019 wt. % Cr, 0.006 wt. % Ni, 0.011-0.016 wt. % Zn, and 0.016 wt. % Ti were DC cast. The ingots were homogenized at 560° C. for more than 6 hours, cooled to 540° C., and held at that temperature for more than 1 hour. The ingots were then pulled hot from the homogenization pits and laid onto a table for hot rolling. The hot rolling step included running the ingots through a reversing mill followed by hot rolling in a tandem mill where the thickness was further reduced. The final exit temperatures of the hot rolled material was targeted to obtain coiling temperatures in the range of 200 to 300° C. A batch annealing step was conducted, which included heating the coil to a desired temperature of from 375° C. to 425° C., followed by soaking for a minimum of 60 minutes. The annealing was carried out in a nitrogen atmosphere with an overall batch annealing heat treatment cycle time of about 8 hours. The coils were pulled off the furnace and allowed to cool to room temperature prior to cold rolling. Cold rolling was conducted after full annealing of the coils. All coils were cold rolled from the hot band gauge to the finish gauge without any intermediate anneals.

CASH was carried out at peak metal temperatures of about 550° C., about 562° C., and about 575° C. with soak times of 15, 30, or 45 seconds. A standard forced air cooling was used for all products with quench rates between about 450° C. to about 250° C. at a rate of about 18° C./second to about 50° C./second. The rewind metal temperature was about 95° C.

Example 2

Determination of Ultimate Tensile Strength and Yield Strength

Coils were prepared as described above in Example 1 and were solution heat treated to a peak metal temperature of about 550° C. for 15 and 45 seconds. The uniform and total elongation and tensile yield strength were determined using methods known to one of ordinary skill in the art according to ASTM B557 and ASTM E8-11.

Figure 7:
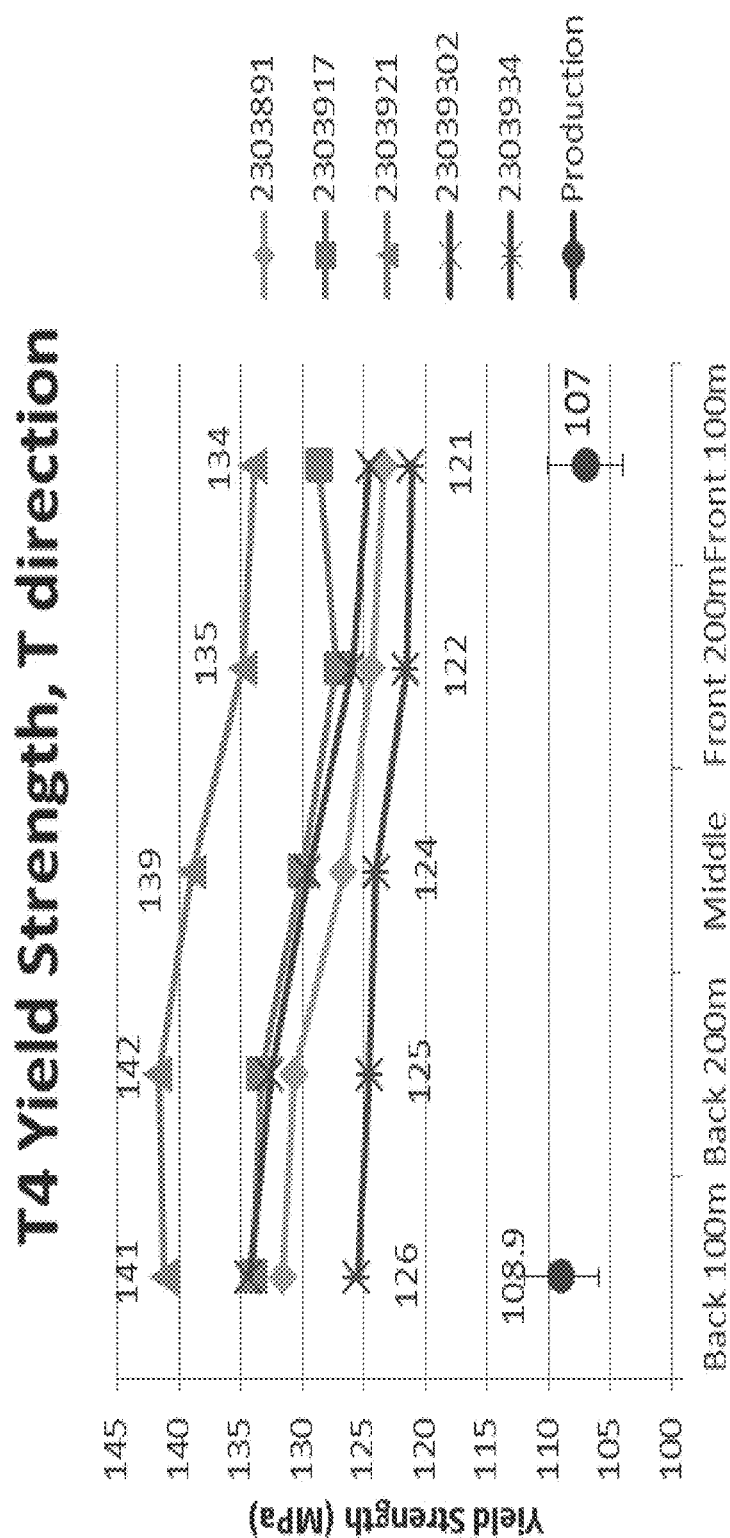
FIG. 7 shows T4 yield strength (in MPa) along the length of production trial coils.

The mechanical property results of the 5 coil plant trial testing in the T4 temper sheets are shown in FIG. 18, Table 4. FIG. 4 is a comparison of T4 tensile yield strengths (TYS in MPa) and ultimate yield strengths (UTS in MPa) of the claimed alloys after self-anneal (SA) and batch anneal (BA). A higher T4 yield strength was obtained in the inventive alloy and process compared to an average yield strength from standard self-annealed production coils, as shown in FIG. 7.

Example 3

Determination of T4 Uniform and Total Elongation

Uniform and total elongation for the sheets from the coils described above were determined using methods known to one of ordinary skill in the art according to ASTM B557 and ASTM E8-11. FIG. 19, Table 5 and FIG. 20, Table 6 show the uniform and total elongation results of plant trial testing.

Example 4

Determination of Paint Bake Tensile Yield Strength

The paint bake tensile yield strength for sheets from the coils described above was determined using methods known to one of ordinary skill in the art according to ASTM B557 and ASTM E8-11. FIG. 5 illustrates the after paint bake yield strength obtained from testing with 2% pre-strain followed by 180° C./20 min exposure. After paint bake strengths are significantly higher in the inventive alloy and process compared to customer typical yield strength.

Example 5

Figure 2:
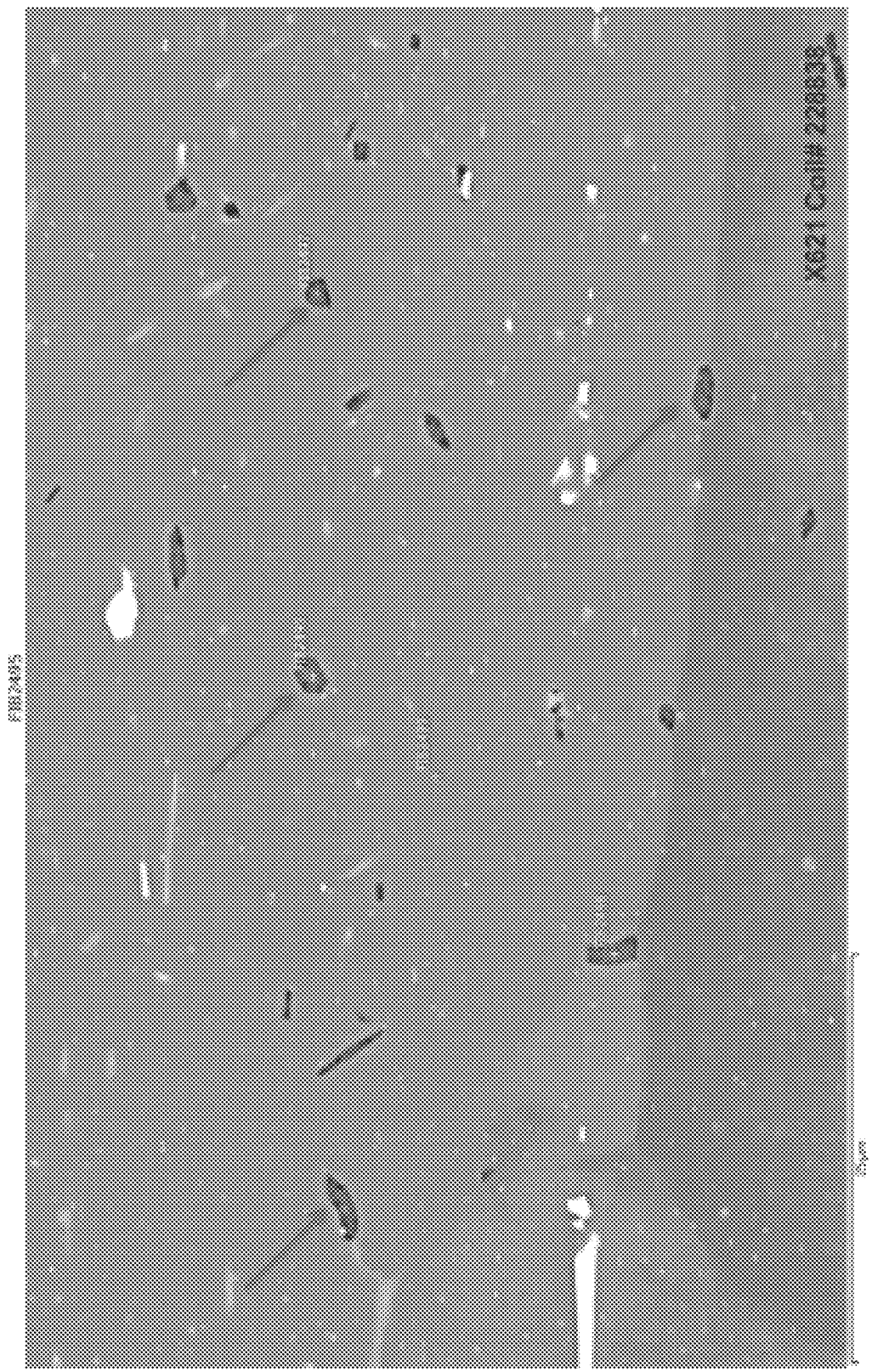
Figure 3:
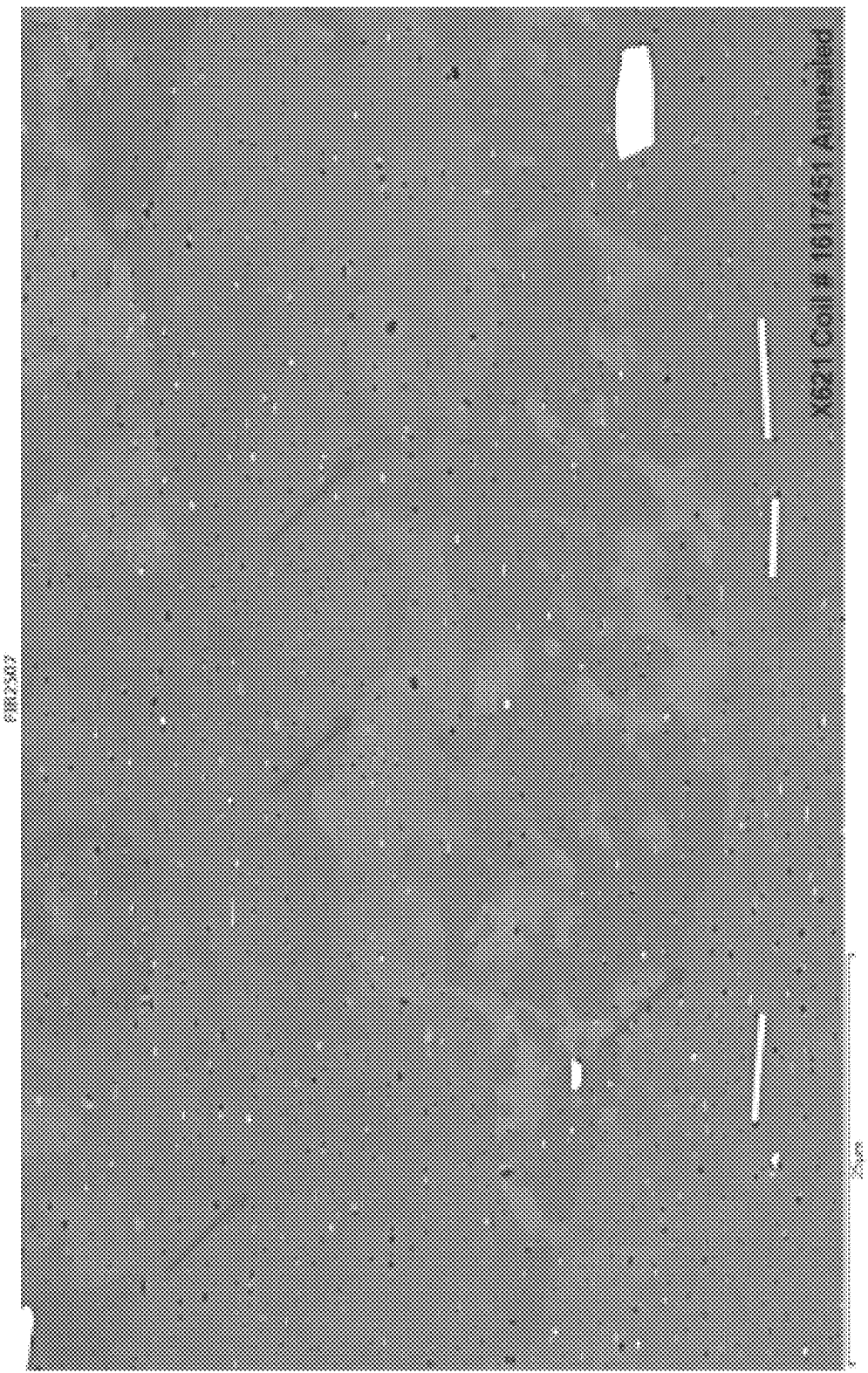

$Mg_2Si$ Size Distribution $Mg_2Si$ size distribution was observed using SEM. Samples taken from batch annealed coils showed smaller particle sizes from those taken from self-annealed coils (FIGS. 2 and 3).

Example 6

Determination of Roping

Roping is a collective deformation of large sets of oriented grains resulting in a banded surface topology, found in 6xxx alloys. These grain sets are activated during plastic deformation and are oriented parallel to the rolling direction. These bands are generally imperceptible on naked samples, but because these grain sets have different height positions (peaks and valleys), they are visually perceptible, for example, after lacquering, or surface stoning. Roping criteria was visually rated as shown in FIG. 16, Table 2.

Figure 8:
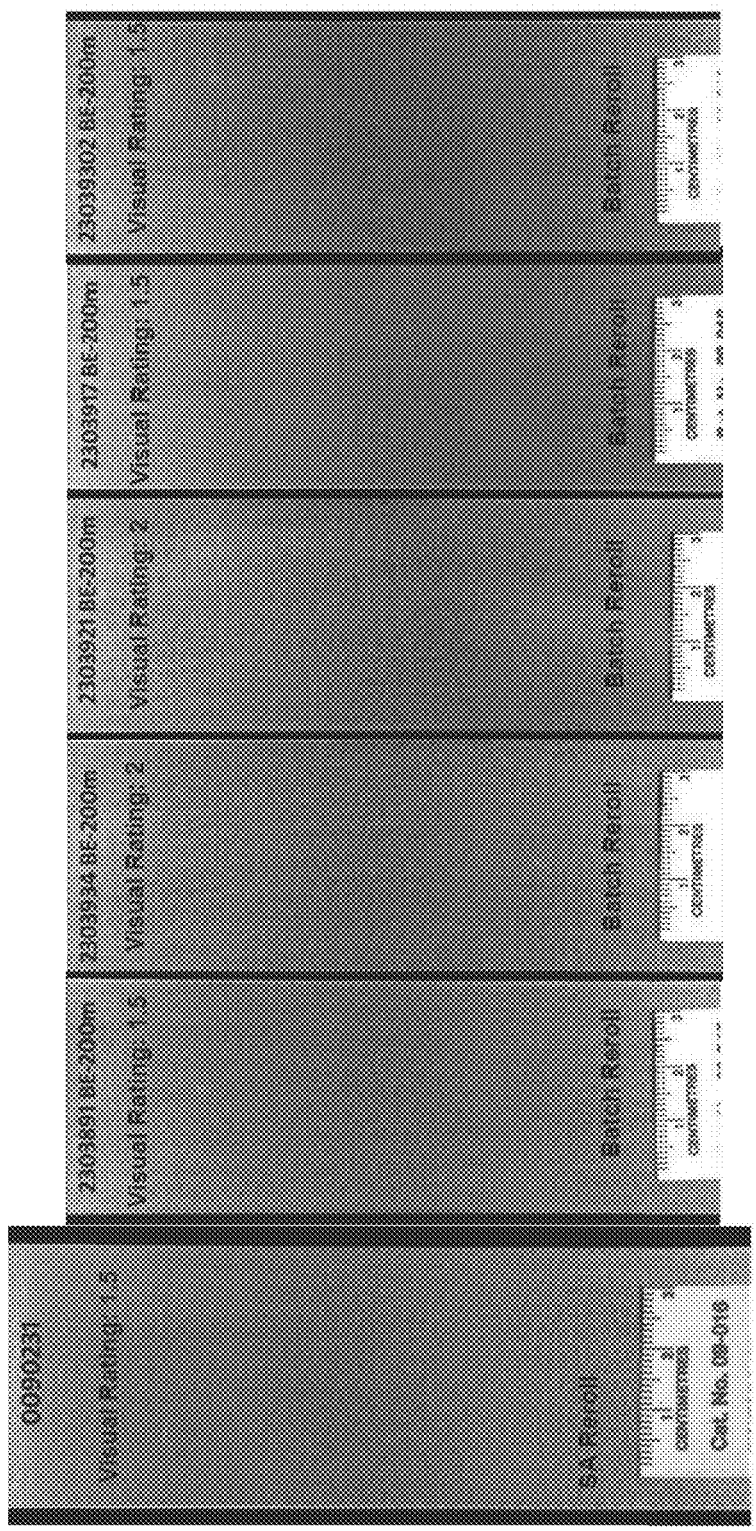
FIG. 8 shows pictures of the roping samples and their ratings for the trial coils along with a standard production self-annealed coil (SA Re-roll).

FIG. 8 shows the roping samples of the trial coils along with standard production self-annealed coil. Samples were pre-strained by 10% in the transverse to the rolling direction followed by stoning to highlight the roping condition. Overall the disclosed alloys and processes provide surface roping ratings that are acceptable.

Example 7

Flat Hem Performance

FIG. 17, Table 3 lists the flat hem testing results for self-annealed coils compared to batch annealed coils in the T4 temper. The material was put through a CASH line at 550° C. for 15 seconds followed by 60 days of natural aging.

FIG. 18, Table 4 lists the flat hem performance ratings for the batch annealed trial coils in T4 temper with 10 and 15% pre-straining. Overall the ratings are 1s and 2s, which are considered as acceptable (refer to FIG. 17, Table 3). One coil sample tested in the L direction with 15% pre-strain showed a rating of 3. This higher hem rating was attributed to the high yield strength observed for that coil.

Example 8

Effect of Cr and Mn on Alloy Tensile Properties and Crashability

Aluminum alloys having the compositions shown in the table below were prepared according to the method described in Example 1. Alloy 1 and Alloy 2 are reference alloys. Alloy 3 is an alloy that includes a greater amount of Mn than the reference alloys and no copper. Alloy 4 is an alloy that includes a greater amount of Cr than the reference alloys. Alloy 5 is an alloy that includes greater amounts of Mn and Cr than the reference alloys. In each of Alloys 1, 2, 3, 4, and 5, the remainder of the composition is aluminum.

| Alloy | Si | Mg | Cu | Fe | Mn | Cr | Ti | Mn + Cr |
|---|---|---|---|---|---|---|---|---|
| Alloy 1 | 0.88 | 0.67 | 0.08 | 0.18 | 0.07 | 0.014 | 0.025 | 0.08 |
| Alloy 2 | 0.89 | 0.67 | 0.09 | 0.2 | 0.08 | 0.01 | 0.02 | 0.09 |
| Alloy 3 | 0.87 | 0.65 | 0.00 | 0.18 | 0.13 | 0.001 | 0.016 | 0.13 |
| Alloy 4 | 0.90 | 0.68 | 0.09 | 0.19 | 0.08 | 0.08 | 0.019 | 0.16 |
| Alloy 5 | 0.87 | 0.67 | 0.08 | 0.19 | 0.14 | 0.07 | 0.02 | 0.21 |

Alloys 1-5 were homogenized by heating at 530° C. for 8 hours. The alloys were hot rolled through a reversing mill, then cold rolled. The final gauge thickness of each of the sheets prepared from Alloys 1-5 was approximately 1 mm. The sheets were solutionized for 20 seconds (indicated as "20s") or 60 seconds (indicated as "60s") at 550° C., and then quenched using water (indicated as "WQ") or air (indicated as "AQ"). The T6 temper was achieved by heating the T4 sheets at 215° C. for 30 minutes or at 225° C. for 30 minutes. The yield strength and bending of the T4 and T6 sheets were determined in the transverse direction using methods known to one of ordinary skill in the art. The tensile tests were performed according to ISO/DIS 6892-1 and the bend tests were performed according to VDA238-100.

Figure 9B:
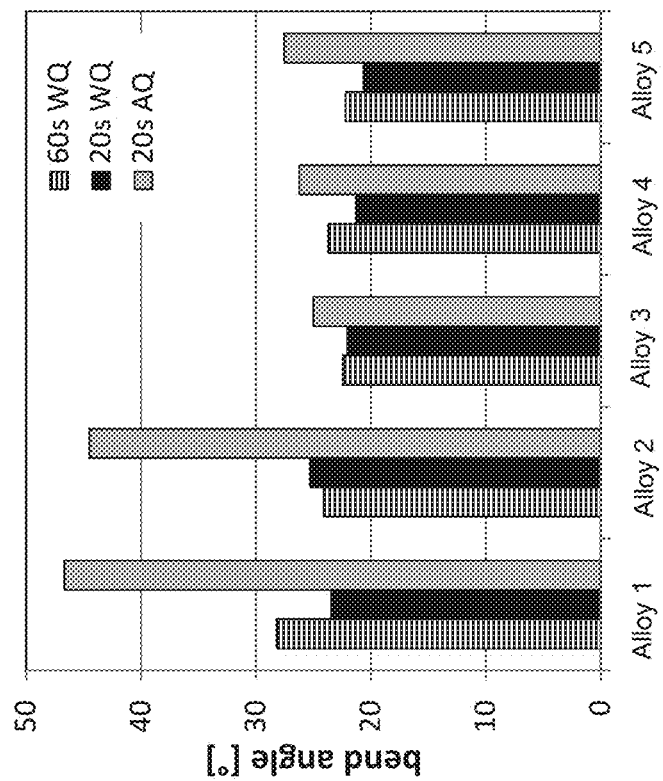
FIG. 9B shows the bend inner angle of T4 sheets prepared from Alloys 1-5 tested in the transverse direction.
Figure 9A:
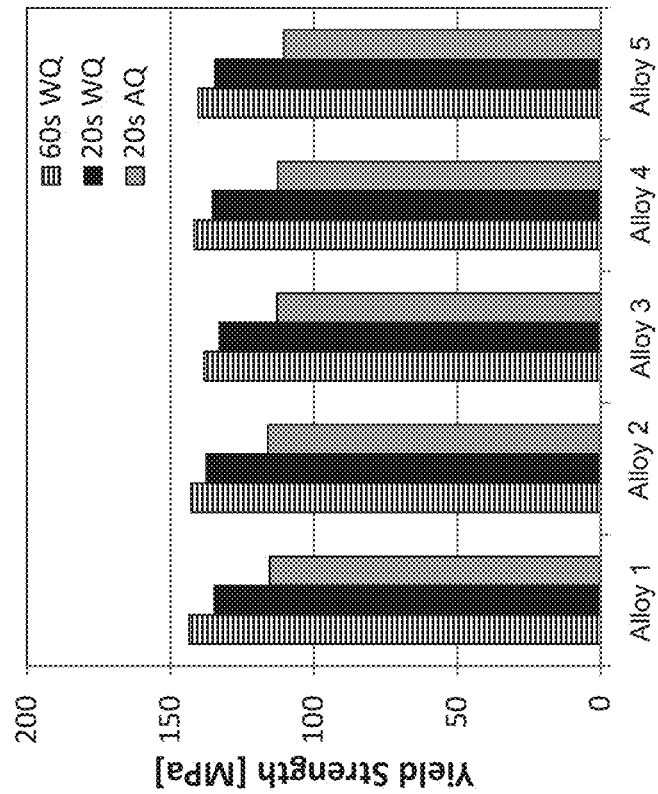
FIG. 9A shows the yield strength results of T4 sheets prepared from Alloys 1-5 tested in the transverse direction.

The yield strength properties of the T4 sheets prepared from Alloys 1-5, prepared using a 20 second solutionizing step followed by air quenching and water quenching, as well as a 60 second solutionizing step followed by water quenching, were determined. See FIG. 9A. The results show that the T4 strength was approximately the same for the five sheets. The bending properties of the T4 sheets were determined after 10% of tensile prestraining. See FIG. 9B. The results show that sheets containing greater amounts of Cr and/or Mn (i.e., sheets prepared from Alloys 3, 4, and 5) prepared by air quenching displayed improved bending properties.

Figure 10B:
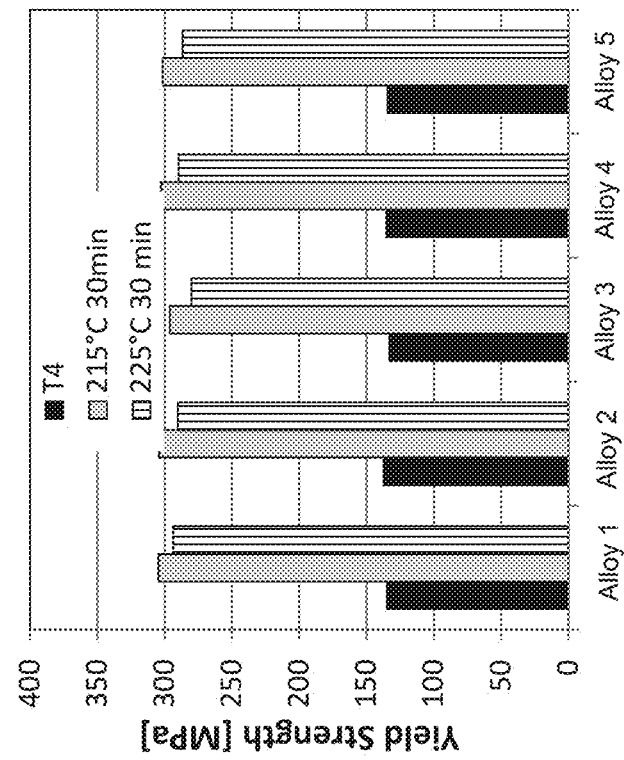
FIG. 10B shows the yield strength results of T6 sheets prepared from Alloys 1-5 using water quenching and tested in the transverse direction.
Figure 10A:
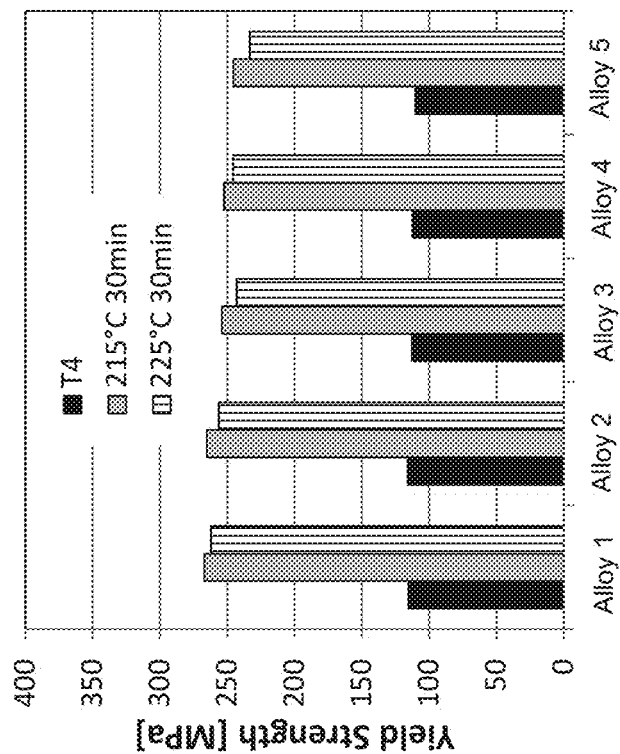
FIG. 10A shows the yield strength results of T6 sheets prepared from Alloys 1-5 using air quenching and tested in the transverse direction.

The tensile strength properties of the T6 sheets prepared from Alloys 1-5, prepared using a 20 second solutionizing step followed by air quenching and water quenching were determined. See FIGS. 10A and 10B. FIGS. 10A and 10B show that the aluminum alloy sheets have a yield strength of at least 100 MPa when in a T6 temper. The results show that the air quenched T6 sheet containing greater amounts of Cr and/or Mn (i.e., sheets prepared from Alloys 3, 4, and 5) displayed a loss of strength of approximately 10-20 MPa more than sheets prepared from the reference Alloys 1 and 2. See FIG. 10A. The strength of the water quenched sheet that excluded Cu (i.e., sheet prepared from Alloy 3) was approximately 10 MPa lower than the sheets prepared from the reference Alloys 1 and 2.

Figure 10D:
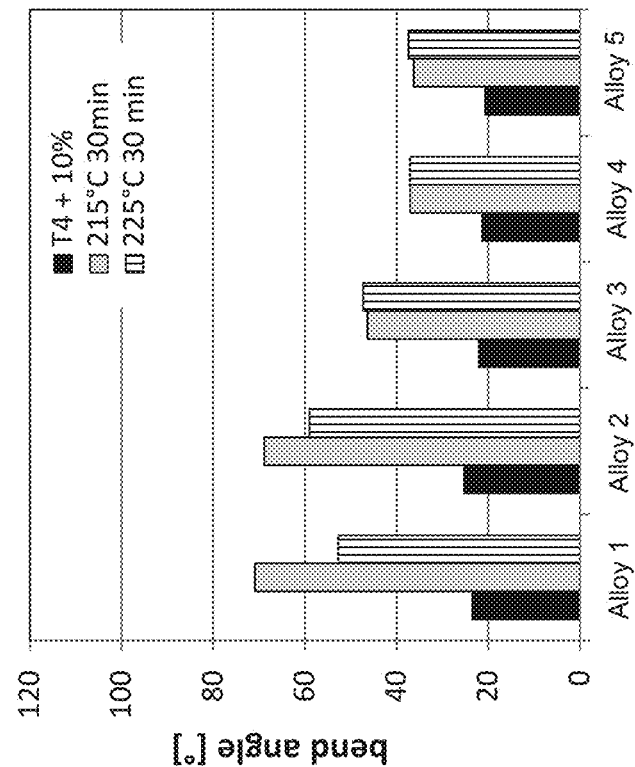
FIG. 10D shows the bend inner angle of T6 sheets prepared from Alloys 1-5 using water quenching and tested in the transverse direction.
Figure 10C:
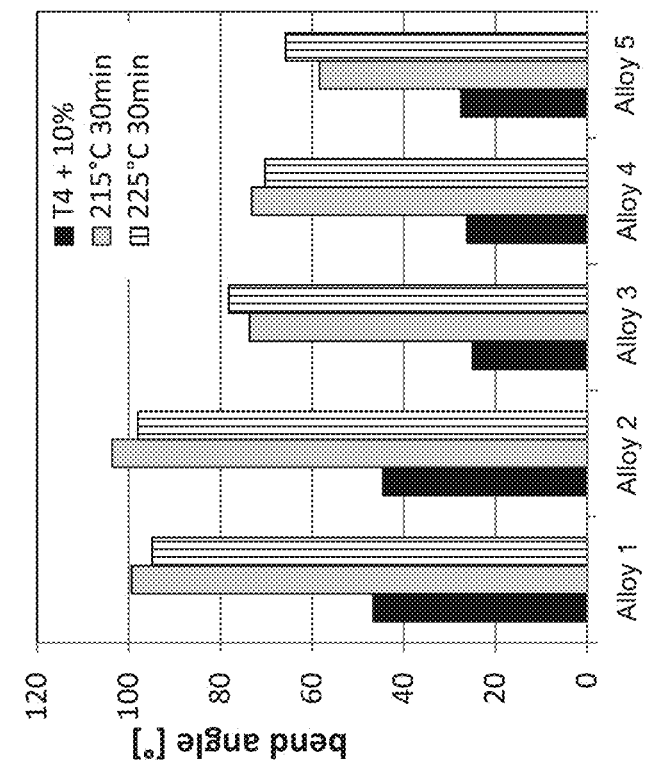
FIG. 10C shows the bend inner angle of T6 sheets prepared from Alloys 1-5 using air quenching and tested in the transverse direction.

The bending properties of the T6 sheets were determined. See FIGS. 10C and 10D. The results show that sheets containing greater amounts of Cr and/or Mn (i.e., sheets prepared from Alloys 3, 4, and 5) displayed improved bending properties over reference Alloys 1 and 2. In addition, the T6 bending further improved for the Cr and/or Mn containing sheets prepared by water quenching as compared to the air quenched samples. See FIGS. 10C and 10D.

Figure 11:
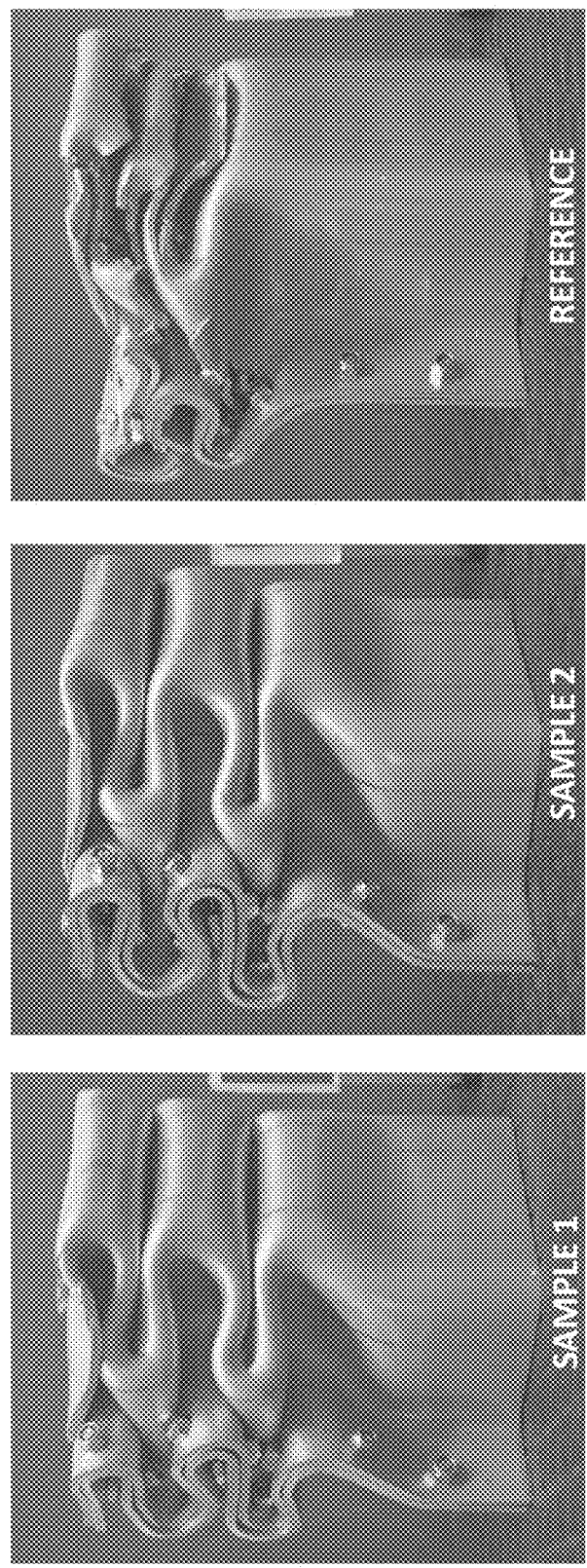
FIG. 11 shows the vertical crash test results of bolted tubes prepared from sheets as described herein.
Figure 12:
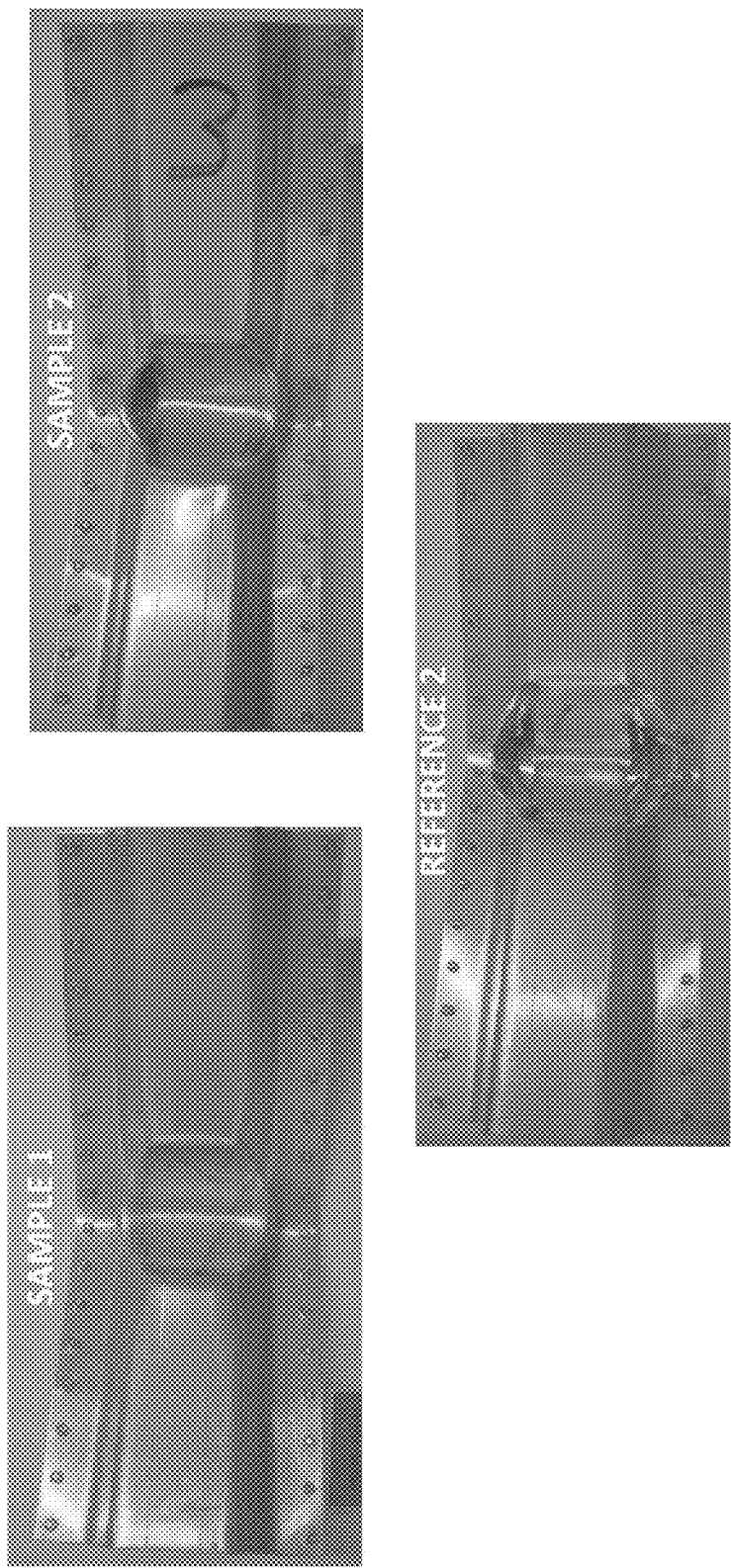
FIG. 12 shows the horizontal crash test results of bolted tubes prepared from sheets as described herein.

Tests were performed to assess the crushing behavior to determine the crashability of the samples. Sheets (3 mm thick) were folded and bolted to form crash tubes. The tubes were tested in vertical compression at a constant quasistatic speed in a press (vertical crash tests) or in a quasistatic 3-point bend setup (horizontal crash tests). The crashability was determined for crash tubes prepared from sheets including Cr and Mn, similar to Alloy 5, and also from a reference sheet similar to Alloys 1 and 2. Vertical and horizontal tests were performed. For the horizontal tests, the sheets used to prepare the crash tubes were heat treated at 180° C. for 10 hours. The sheets used to prepare the crash tubes for the vertical tests were heated at 185° C. for 15 minutes. As shown in FIG. 11, the crash tubes containing increased amounts of Cr and Mn successfully folded upon crushing with no tearing in the vertical crash test, whereas the reference crash tubes exhibited tearing. The crash tubes containing increased amounts of Cr and Mn also showed improved crashability in a horizontal crash test as compared to the reference fixture. See FIG. 12.

Example 9

Strength, Roping, and Hemming Performance

Coil Compositions:
  Coils were prepared from aluminum alloys having the compositions shown in the table below.

| Coil | Al | Cu | Si | Fe | Ti | Mg | Mn | Cr |
|---|---|---|---|---|---|---|---|---|
| 0127602 | 98.05 | 0.10 | 0.79 | 0.26 | 0.02 | 0.63 | 0.08 | 0.01 |
| 0127622 | 98.05 | 0.11 | 0.79 | 0.25 | 0.03 | 0.61 | 0.09 | 0.02 |
| 0127681 | 98.04 | 0.10 | 0.78 | 0.24 | 0.02 | 0.63 | 0.10 | 0.01 |
| 0127619 | 98.05 | 0.11 | 0.79 | 0.25 | 0.03 | 0.61 | 0.09 | 0.02 |

Sample Preparation:
  Ingots of the compositions shown above were each homogenized by heating the ingots to 560° C. for 6 hours, cooling the ingots to 540° C., and allowing the ingots to soak at 540° C. for 2 hours. The ingots were then hot rolled and coiled at a temperature ranging from 209° C. to 256° C. Coil 0127619 was hot rolled to a 2.54 mm gauge and the other coils were hot rolled to a 5 mm gauge. The reroll for each of the coils was relatively free from coarse $Mg_2Si$/Si particles and the grain structure was unrecrystallized. The four coils were reroll batch annealed with a soaking time of 100 minutes at soak temperatures ranging from 398° C. to 418° C. The rerolls were fully recrystallized and exhibited a relatively finer particle structure than that of the conventional self-annealed reroll. CASH was carried out at temperatures ranging from about 539° C. to 555° C. with soak times ranging from 8 to 15 seconds. Quenching was performed using water or air. The rewind metal temperature ranged from 73° C. to 85° C.

Figure 13A:
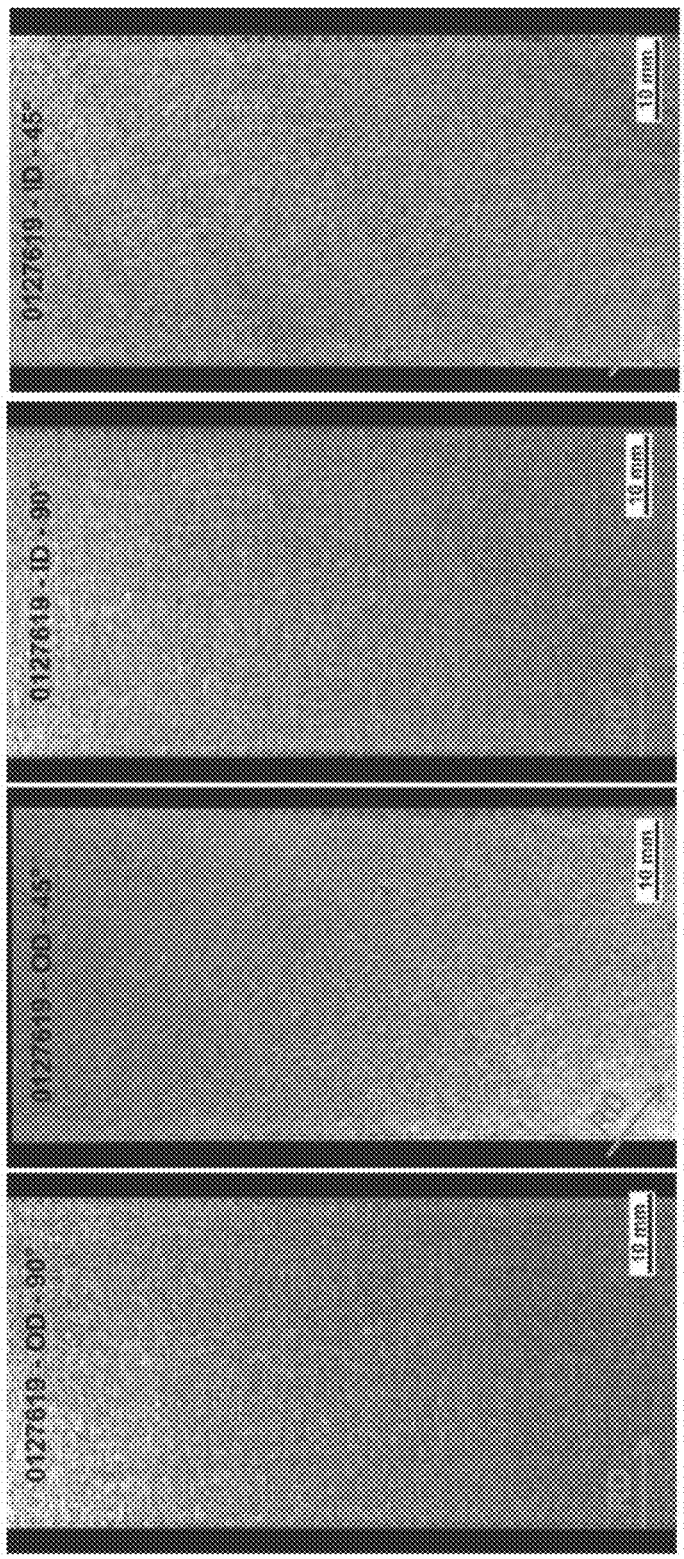
FIG. 13A shows roping samples for the inner and outer diameters of coil 0127619 in the rolling direction and 45° to the rolling direction.
Figure 13B:
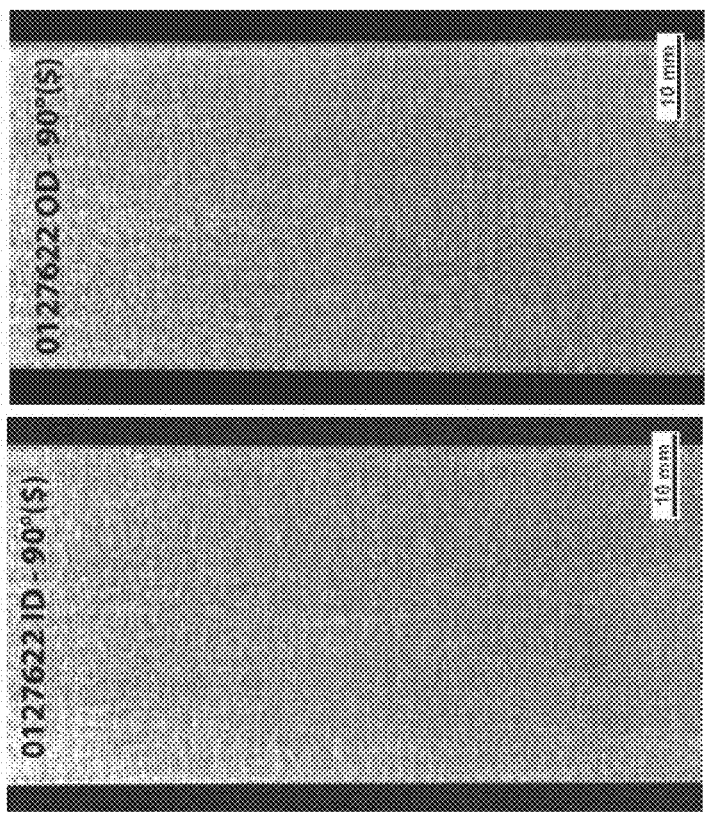
FIG. 13B shows roping samples for the inner and outer diameters of coil 0127622 in the rolling direction.
Figure 13C:
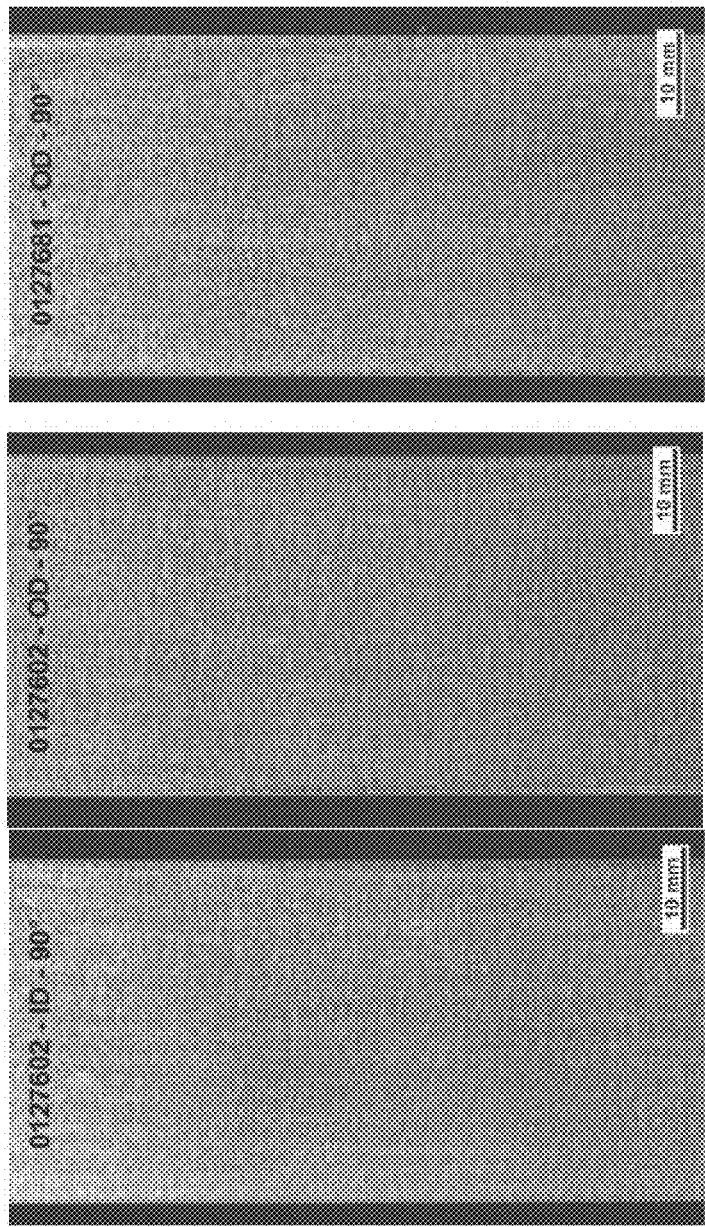
FIG. 13C shows roping samples for the inner and outer diameters of coil 0127602 in the rolling direction and for the outer diameter of coil 0127681 in the rolling direction.

Roping Analysis:

The inner diameters (IDs) and outer diameters (ODs) of the coils were analyzed for roping, using the rating scale provided in FIG. 16, Table 2, in the rolling direction (90°) and 45° to the rolling direction. All coils displayed suitable roping results and were assigned a rating of 1. See FIG. 13A for Coil 0127619; FIG. 13B for Coil 0127622; and FIG. 13C for Coils 0127602 and 0127681.

Samples Aged 4-5 Days: Tensile Properties and Bend Ratings

The tensile properties were determined for the coils after 4 or 5 days of natural ageing. Specifically, the tensile properties for Coil 0127619 were determined after 4 days of natural ageing and the tensile properties for Coils 0127622, 0127602, and 0127681 were determined after 5 days of natural ageing. The results are shown in FIG. 21, Table 7. All coil samples displayed ultimate tensile strength levels of greater than 215 MPa and yield strength values within the range of 100-155 MPa. In addition, the average elongation for each coil was greater than 27%. The average elongation was calculated as follows:

$$Average\ Elongation=(Transverse+2*Diagonal+Longitudinal)/4.$$

The bend ratings of the coils were determined. The samples from Coils 0127622. 0127602, and 0127681 were pre-bent to 160° using a 0.50 mm punch and a gap of 3.85 mm on a three point bend setup with 15 mm rollers. The samples were hemmed with a 0.82 mm shim on a 1 Ton Arbor press. The sample from Coil 0127619 was pre-bent to 180°. FIG. 22, Table 8 through FIG. 25, Table 11 list the flat hem performance ratings for the batch annealed trial coils 0127619 (FIG. 22, Table 8), 0127622 (FIG. 23, Table 9), 0127602 (FIG. 24, Table 10), and 0127681 (FIG. 25, Table 11) after 4 or 5 days of natural ageing with 0%, 5%, 10%, and/or 15% pre-straining. The testing was performed on the inner diameter (ID) and/or the outer diameter (OD) of the coils. Overall, the ratings are 1s and 2s, which are considered as acceptable (refer to FIG. 17, Table 3).

Samples Aged 24-45 Days: Tensile Properties and Bend Ratings

The tensile properties were determined for the coils after 24-45 days of natural ageing. Specifically, the tensile properties for Coil 0127619 were determined after 29 days of natural ageing, the tensile properties for Coil 0127622 were determined after 24 days of natural ageing, and the tensile properties for Coils 0127602 and 0127681 were determined after 45 days of natural ageing. The results are shown in FIG. 26, Table 12. All coil samples displayed ultimate tensile strength levels of greater than 215 MPa and yield strength values within the range of 100-155 MPa. In addition, the average elongation for each coil was greater than 27%. The average elongation was calculated as follows:

$$Average\ Elongation=(Transverse+2*Diagonal+Longitudinal)/4.$$

The tensile properties for the coil samples described above were also determined after paint-baking. The results are shown in FIG. 27, Table 13. All coil samples displayed ultimate tensile strength levels of greater than 280 MPa and yield strength values greater than 200 MPa. In addition, the average elongation for each coil was 24% or greater. The average elongation was calculated according to the equation shown above.

The bend ratings of the coils were determined. The samples were pre-bent to 180° and had a Mandrel radius of 0.45 mm. FIG. 28, Table 14 lists the hem performance ratings for the coils 0127619, 0127622, 0127602, and 0127681 after the indicated number of days of natural ageing with 0%, 5%, 10%, and/or 15% pre-straining. The testing was performed on the inner diameter (ID), middle, and/or the outer diameter (OD) of the coils. Overall, the ratings for the coils subjected to 5% and 10% pre-straining were 1s and 2s, which are considered as acceptable (refer to FIG. 17, Table 3).

Figure 14:
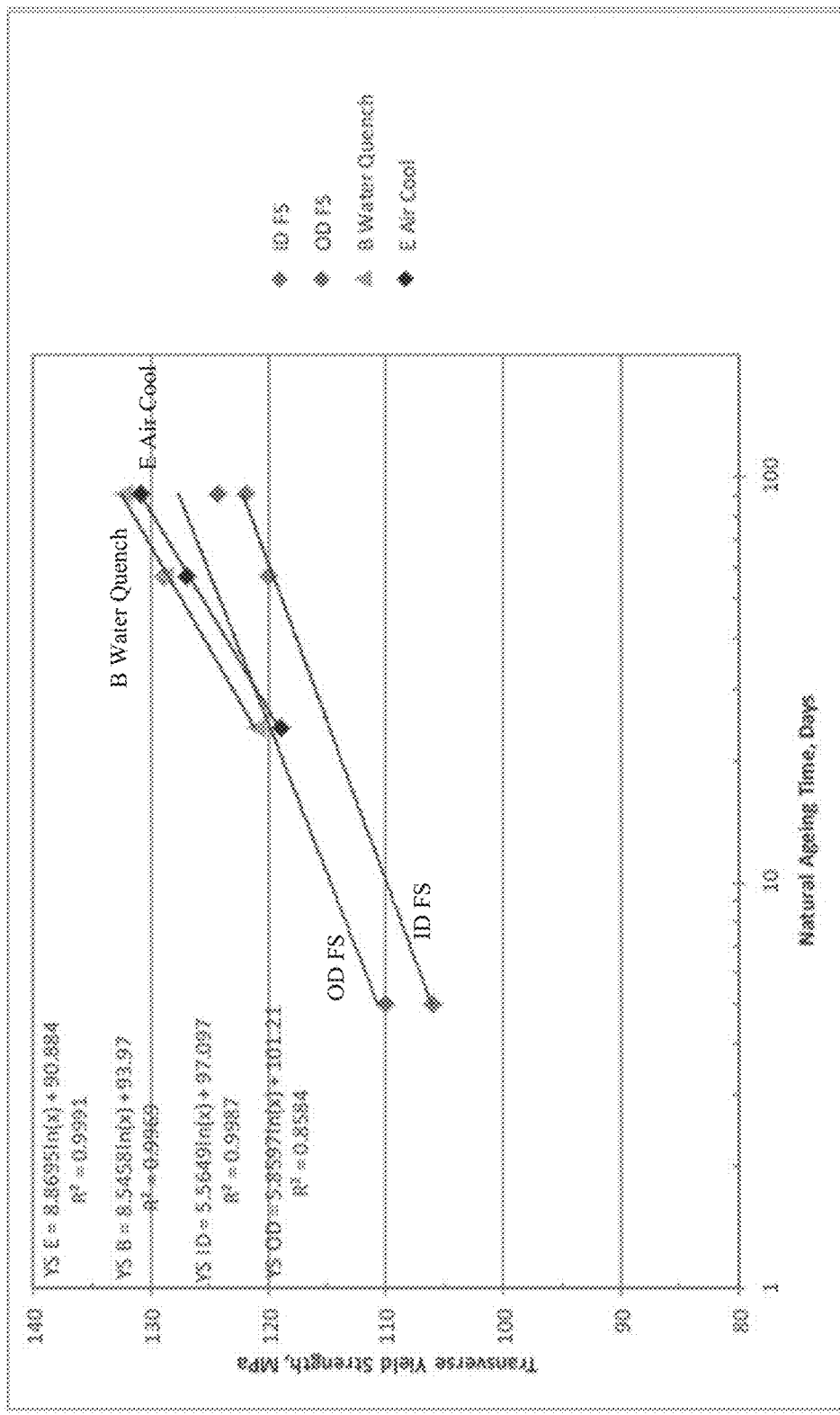
FIG. 14 shows the transverse yield strength plotted against the natural ageing time for coil 0127622 for samples prepared by air quenching and water quenching and for the inner and outer diameters of the coil.

The yield strengths obtained by water quenching and air quenching samples from Coil 0127622, as well as the yield strengths obtained from the inner and outer diameters of the samples, were plotted against the natural ageing time, in days. See FIG. 14. As shown in FIG. 14, the transverse yield strength was controlled to a value between 100 to 135 MPa for up to 100 days of natural ageing.

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. An aluminum alloy comprising about 0.20-1.0 wt. % Si, 0.11-0.40 wt. % Fe, 0.0-0.23 wt. % Cu, 0.0-0.22 wt. % Mn, 0.50-0.83 wt. % Mg, 0.0-0.25 wt. % Cr, 0.0-0.006 wt. % Ni, 0.0-0.15 wt. % Zn, 0.0-0.17 wt. % Ti, up to 0.15 wt. % impurities, with the remainder as Al, wherein the aluminum alloy comprises a yield strength of at least 100 MPa when the aluminum alloy is in a T4 temper.

2. The aluminum alloy of claim 1, comprising about 0.60-0.95 wt. % Si, 0.20-0.35 wt. % Fe, 0.05-0.20 wt. % Cu, 0.05-0.20 wt. % Mn, 0.55-0.75 wt. % Mg, 0.0-0.15 wt. % Cr, 0.0-0.006 wt. % Ni, 0.0-0.15 wt. % Zn, 0.0-0.15 wt. % Ti, up to 0.15 wt. % impurities, with the remainder as Al.

3. A motor vehicle body part comprising an aluminum alloy comprising about 0.20-1.0 wt. % Si, 0.11-0.40 wt. % Fe, 0.0-0.23 wt. % Cu, 0.0-0.22 wt. % Mn, 0.50-0.83 wt. % Mg, 0.0-0.25 wt. % Cr, 0.0-0.006 wt. % Ni, 0.0-0.15 wt. % Zn, 0.0-0.17 wt. % Ti, up to 0.15 wt. % impurities, with the remainder as Al, wherein the aluminum alloy comprises a yield strength of at least 100 MPa when the aluminum alloy is in a T4 temper.

4. The motor vehicle body part of claim 3, wherein the motor vehicle body part comprises an outer panel.

5. An aluminum alloy comprising about 0.20-1.0 wt. % Si, 0.11-0.40 wt. % Fe, 0.0 0.23 wt. % Cu, 0.0-0.22 wt. % Mn, 0.50-0.83 wt. % Mg, 0.0-0.25 wt. % Cr, 0.0-0.006 wt. % Ni, 0.0-0.15 wt. % Zn, 0.0-0.17 wt. % Ti, up to 0.15 wt. % impurities, with the remainder as Al, wherein the aluminum alloy comprises a yield strength of at least 100 MPa when the aluminum alloy is in a T6 temper.

6. The aluminum alloy of claim 5, comprising about 0.60-0.95 wt. % Si, 0.20-0.35 wt. % Fe, 0.05-0.20 wt. % Cu, 0.05-0.20 wt. % Mn, 0.55-0.75 wt. % Mg, 0.0-0.15 wt. % Cr, 0.0-0.006 wt. % Ni, 0.0-0.15 wt. % Zn, 0.0-0.15 wt. % Ti, up to 0.15 wt. % impurities, with the remainder as Al.

7. A motor vehicle body part comprising an aluminum alloy comprising about 0.20-1.0 wt. % Si, 0.11-0.40 wt. % Fe, 0.0-0.23 wt. % Cu, 0.0-0.22 wt. % Mn, 0.50-0.83 wt. % Mg, 0.0-0.25 wt. % Cr, 0.0-0.006 wt. % Ni, 0.0-0.15 wt. % Zn, 0.0-0.17 wt. % Ti, up to 0.15 wt. % impurities, with the remainder as Al, wherein the aluminum alloy comprises a yield strength of at least 100 MPa when the aluminum alloy is in a T6 temper.

8. The motor vehicle body part of claim 7, wherein the motor vehicle body part comprises an outer panel.

* * * * *